United States Patent
Sang et al.

(10) Patent No.: US 12,435,237 B2
(45) Date of Patent: Oct. 7, 2025

(54) UV RESISTANT SURFACING MATERIALS FOR COMPOSITE PARTS

(71) Applicant: Cytec Industries Inc., Princeton, NJ (US)

(72) Inventors: Junjie Jeffrey Sang, Newark, DE (US); Dalip K. Kohli, Churchville, MD (US)

(73) Assignee: CYTEC INDUSTRIES INC., Lawrence, NJ (US)

(*) Notice: Subject to any disclaimer, the term of this patent is extended or adjusted under 35 U.S.C. 154(b) by 576 days.

(21) Appl. No.: 17/789,012

(22) PCT Filed: Dec. 23, 2020

(86) PCT No.: PCT/US2020/066941
§ 371 (c)(1),
(2) Date: Jun. 24, 2022

(87) PCT Pub. No.: WO2021/133972
PCT Pub. Date: Jul. 1, 2021

(65) Prior Publication Data
US 2023/0091593 A1    Mar. 23, 2023

Related U.S. Application Data

(60) Provisional application No. 62/954,361, filed on Dec. 27, 2019.

(51) Int. Cl.
*C09D 163/00* (2006.01)
*C08G 59/18* (2006.01)
(Continued)

(52) U.S. Cl.
CPC ......... *C09D 163/00* (2013.01); *C08G 59/184* (2013.01); *C08K 7/26* (2013.01); *C09D 7/61* (2018.01); *C09D 7/70* (2018.01)

(58) Field of Classification Search
CPC ...... C08L 63/00–10; C09D 163/00–10; C08K 7/18; C08K 7/24; C08K 7/26; C08G 59/184

See application file for complete search history.

(56) References Cited

U.S. PATENT DOCUMENTS 4,386,173 A * 5/1983 Chang ................. C09D 163/00
                                                523/453
4,778,851 A * 10/1988 Henton ................... C08L 51/04
                                                525/902
(Continued)

FOREIGN PATENT DOCUMENTS

EP       2013259 A2      1/2009
WO    2007127032 A2    11/2007
(Continued)

OTHER PUBLICATIONS

Duan et al., "On-line monitoring of cycloaliphatic epoxy/acrylate interpenetrating polymer networks formation and characterization of their mechanical properties," J. Polym. Res. 16:45-54 (Year: 2009).*

*Primary Examiner* — Kregg T Brooks
(74) *Attorney, Agent, or Firm* — Thi Dang

(57) ABSTRACT

A surfacing material that can provide improved UV resistance while providing good surface properties. The surfacing material includes a resin layer formed from a curable resin composition containing: (A) one or more cycloaliphatic epoxy resin(s), each having two or more epoxy groups per molecule; (B) an epoxy-amine adduct having two or more epoxy groups per molecule and obtained by a reaction of (i) an epoxy compound having two or more alicyclic epoxy groups per molecule with (ii) an amine compound having two or more amino groups per molecule; (C) a curing agent and/or a catalyst; (D) ceramic micro-
(Continued)

spheres; and (E) a flow control agent in the form of inorganic particles, which are not ceramic microspheres.

21 Claims, 1 Drawing Sheet

(51) Int. Cl.
*C08K 7/26* (2006.01)
*C09D 7/40* (2018.01)
*C09D 7/61* (2018.01)

(56) References Cited

U.S. PATENT DOCUMENTS

| | | | |
|---|---|---|---|
| 2009/0068473 A1* | 3/2009 | Van Wessel | C09D 163/00 428/416 |
| 2012/0142816 A1* | 6/2012 | Argyropoulos | C09D 163/00 523/400 |
| 2018/0370083 A1 | 12/2018 | Kumar | |

FOREIGN PATENT DOCUMENTS

| WO | 2017095810 A1 | 6/2017 |
|---|---|---|
| WO | 2017112766 A1 | 6/2017 |

* cited by examiner

UV RESISTANT SURFACING MATERIALS FOR COMPOSITE PARTS

CROSS-REFERENCE TO RELATED APPLICATIONS

The instant application is a U.S. national phase entry under 35 U.S.C. § 371 of International Application No. PCT/US2020/066941 filed on Dec. 23, 2020, which claims the benefit of prior U.S. Provisional Application No. 62/954,361 filed on Dec. 27, 2019, the content of each of these prior filed applications is incorporated herein by reference in its entirety.

DETAILED DESCRIPTION

Fiber-reinforced, polymer matrix composite (PMC) is a high-performance structural material that is commonly used in applications requiring resistance to aggressive environments, high strength, and/or low weight. Examples of such applications include aircraft components (e.g., tails, wings, fuselages, and propellers), high performance automobiles, boat hulls, and bicycle frames. Composite structural parts for aerospace applications typically include a protective outer film, often called "surfacing film", to provide the required performance characteristics to the composite structures prior to painting. Such surfacing film is used to improve the surface quality of the structural parts while reducing labor, time and cost. The surfacing film is usually co-cured with the fiber-reinforced polymer matrix composite materials during the manufacturing of the structural parts.

Conventional epoxy-based surfacing films are mostly based on aromatic epoxy resins due to their superior mechanical properties. Aromatic epoxy resins are characterized by having aromatic benzene ring structure in the epoxy. Bisphenol-based epoxy resins is the most common epoxy resins based on reacting epichlorohydrin (ECH) with bisphenol A, known as bisphenol A diglycidyl ether (BADGE, or DGEBA). Novolac epoxy resin is another common aromatic epoxy derived from the reaction of epichlorohydrin and novolaks, such as epoxyphenol novolak (EPN) or epoxycresol novolak (ECN).

It has been found that such conventional surfacing films lack ultraviolet (UV) resistance such that, after exposure to UV radiation, they showed color change and/or surface degradation, i.e., chalking and loss of paint adhesion. It is believed that surfacing materials based on aromatic epoxy resins are susceptible to degradation from ultraviolet light (UV) exposure due to the fact that the aromatic epoxy resin is a good chromophore. Previous efforts to improve the UV resistance of these aromatic epoxy-based films by inclusion of UV absorbers and stabilizers have not been very successful because the inherent UV sensitivity of aromatic structure in the epoxy molecule. Aliphatic epoxies have been used also to improve resistance to UV exposure, but it has been found that, for the aerospace applications, the use of such aliphatic epoxies lead to inferior mechanical performance in terms of lower glass transition temperature (Tg), lower strength and toughness and inferior long-term durability.

A known solution to prevent UV exposure and damage is to cover all exposed surfaces of a composite structure with a paint primer containing UV protection additives prior to final part assembly or painting. Typically, such primer is applied soon after de-molding the composite part from a molding tool. The drawbacks to using the paint primer include high labor and maintenance costs, added weight and adverse environmental impacts due to the organic solvents typically used in the paint primers.

The use of gel coats or other protective coatings such as paints with UV protection properties have been the more effective way of protecting the surfacing film from UV exposure. However, both gel coats and paints require regular re-application and are not considered permanent fixes. Pigmented thermoplastic films, such as PTFE films, can offer UV protection and ease of use but lack drape-ability on contoured areas of structural parts.

Disclosed herein is a multi-functional surfacing material that can provide improved UV resistance while providing good surface properties such as smoothness and free of porosity. Furthermore, upon curing, this multi-functional surfacing material is free of defects and is "paint-ready", i.e., does not require additional surface treatment prior to painting. When a conductive material is incorporated into the surfacing material, lighting strike protection (LSP) can be achieved. This multi-functional surfacing material is light in weight (less than 300 gsm ($g/m^2$) in areal weight) and its manufacturing cost is reduced as compared to conventional surfacing materials. In some applications, the areal weight of the surfacing material is in the range 50-200 gsm, or 0.05-0.04 psf.

In one embodiment, the multi-functional surfacing material consists of a single resin film formed from a curable resin composition containing:
 (A) one or more cycloaliphatic epoxy resin(s), each having at least one alicyclic skeleton and two or more epoxy groups per molecule;
 (B) an epoxy-amine adduct that has two or more epoxy groups per molecule and is obtained by a reaction of (i) an epoxy compound having two or more alicyclic epoxy groups per molecule with (ii) an amine compound having two or more amino groups per molecule;
 (C) a curing agent and/or catalyst;
 (D) ceramic microspheres; and
 (E) a flow control agent in the form of inorganic particles that is different from component (D).

The epoxy-amine adduct contains terminal epoxy functional groups, which can react with the curing agent or catalyst due to the reactive epoxy groups on its chemical structure.

Components A and B combined constitute more than 40% in weight percentage (wt %), based on the total weight of the curable resin composition. The relative amounts of Components A and B, based on total weight of curable resin composition, may be as follows: 5 to 30 wt % of component (A), and 15-55 wt % of component (B). Alternatively, the relative amounts of Components (A) and (B) may be described as follows: 5 to 80 parts by weight, or 10 to 75 parts by weight, or 20 to 65 parts by weight of A, per 100 parts by weight of A and B combined (or A+B).

The amount of curing agent and/or catalyst in the curable resin composition varies depending on the choices selected. The curing agents and catalysts will react with the epoxy resins in the composition to provide a crosslinked thermoset matrix. The curing agent generally reacts with the available epoxy resin and becomes incorporated into the cured thermoset network. The catalyst initiates polymerization of the epoxy groups and form cured thermoset network.

The amount of ceramic microspheres (D) in the curable resin composition may be in the range of 10-30 wt %, and the amount of flow control agent may be in the range of 2-8 wt %, based on total weight of curable resin composition.

In a preferred embodiment, the curable resin composition contains Components A-E discussed above and an inorganic pigment (F) selected from metal oxides and carbon black. Preferred metal oxides include white titanium oxide ($TiO_2$) and red iron oxide. The amount of component F may be in the range of 5-30 wt %, based on the total weight of the curable resin composition.

In another preferred embodiment, the curable resin composition contains Components A to E or A to F discussed above plus a toughening agent (G) that is not an epoxy-amine adduct, i.e., that is different from Component B. The toughening agent (G) may be selected from thermoplastic polymers, elastic polymers, and core-shell rubber (CSR) particles. Preferred toughening agents are selected from: (i) polyvinyl acetal resin (PVB); (ii) polyvinyl formal resin; (iii) copolymer of polyether sulfone (PES) and polyether ether sulfone (PEES); (iv) core-shell rubber (CSR) particles, and combinations thereof. The amount of Component G may be in the range of 1-15 wt %, based on the total weight of the curable resin composition.

The curable resin composition, according to any one of the embodiments disclosed herein, may further contain additional components other than those mentioned previously in order to further modify the properties of the surfacing material.

In preferred embodiments, the curable resin composition does not contain any aromatic epoxy resins since they are susceptible to degradation from UV exposure. Such aromatic epoxy resins include Bisphenol-based epoxy resins, Novolac epoxy, and other multifunctional aromatic epoxy resins such as EPON™ 828 (Bisphenol-A diglycidyl ether), DER™ 331 (a liquid reaction product of epichlorohydrin and bisphenol A), Araldite® PY 306 (Bisphenol-F diglycidyl ether), DEN™ 439 (epoxy novolac resin—a reaction product of epichlorohydrin and phenol-formaldehyde novolac), DEN™ 431 (epoxy novolac resin—a reaction product of epichlorohydrin and phenol-formaldehyde novolac), Araldite® MY 0510 (Diglycidyl ether of para-aminophenol), and Araldite® MY 721 (N,N,N',N'-Tetraglycidyl-4,4'-methylenebisbenzenamine).

After curing the resin film formed from the curable resin composition described herein, the cured film is considered "UV stable", meaning that, after UV exposure, it shows no apparent surface color shift or having a total color shift ΔE* of less than 1 or 2.5.

Cycloaliphatic Epoxy Resins

Cycloaliphatic epoxy resins (Component A) are characterized by non-aromatic saturated rings in their molecular structures. The term "epoxy resin" as used herein refers to monomers, oligomers and polymers containing epoxide groups. The cycloaliphatic epoxy resin (A) for use in the curable resin composition disclosed herein is a compound having at least one alicyclic skeleton (or saturated carbon ring) and two or more epoxy groups per molecule. Suitable cycloaliphatic epoxy resins include compounds expressed by the following general Formula (I):

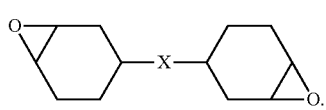

(I)

In the general Formula (I), X represents a single bond or a linkage group. The linkage group is exemplified by divalent hydrocarbon groups, carbonyl group (—CO—), ether bond (—O—), ester bond (—COO—), amide bond (—CONH—), carbonate bond (—OCOO—), and groups that contain two or more of these linked to each other. The divalent hydrocarbon groups are preferably exemplified by straight or branched chain alkylene groups having 1 to 18 carbon atoms (of which those having 1 to 6 carbon atoms are more preferred); and divalent alicyclic hydrocarbon groups (of which divalent cycloalkylene groups are more preferred). The straight or branched chain alkylene groups are typified by methylene, methylmethylene, dimethylmethylene, ethylene, propylene, and trimethylene groups. The divalent alicyclic hydrocarbon groups are typified by 1,2-cyclopentylene, 1,3-cyclopentylene, cyclopentylidene, 1,2-cyclohexylene, 1,3-cyclohexylene, 1,4-cyclohexylene, and cyclohexylidene groups.

Of the cycloaliphatic epoxy compounds represented by the general Formula (I), preferred are those prepared by oxidizing a corresponding alicyclic olefin compound typically with an aliphatic peroxycarboxylic acid, which aliphatic peroxycarboxylic acid is substantially anhydrous.

Examples of suitable di-functional cycloaliphatic epoxy compounds include epoxies having the following chemical structures:

(1)

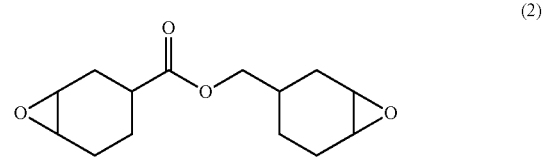

(2)

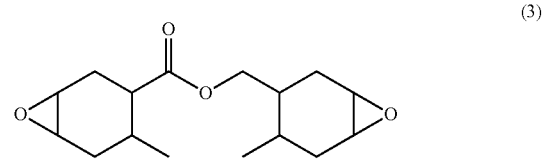

(3)

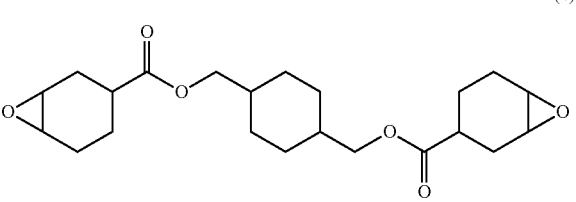

(4)

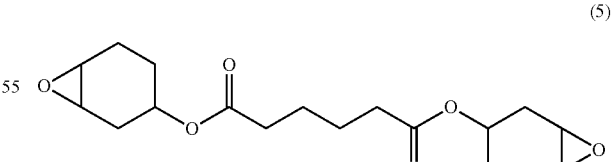

(5)

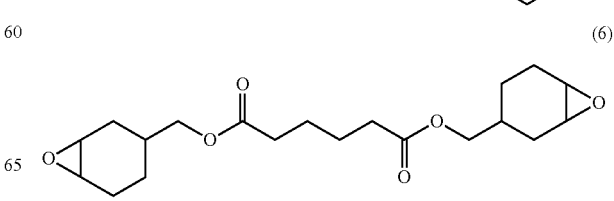

(6)

(7)

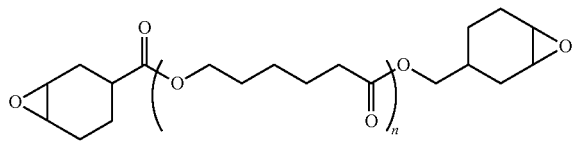

where n denotes an integer of 1 to 30.

Exemplary cycloaliphatic epoxy compounds usable herein as Component A further include, in addition to the above compounds, glycidyl ether compounds in which epoxy groups do not include a carbon atom constituting an alicyclic skeleton (e.g., glycidyl ether epoxy compounds, each having at least one alicyclic skeleton and glycidyl ether groups). These compounds are specifically exemplified by the following compounds:

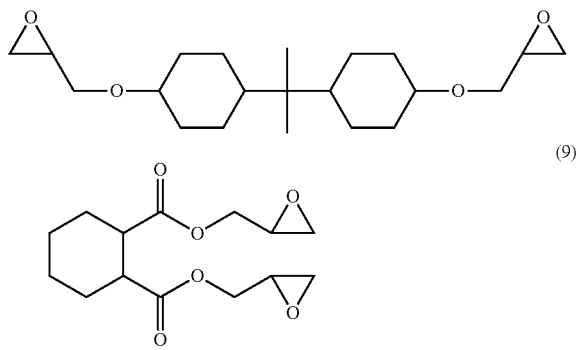

Hexahydro phthalic acid diglycidyl ester

Cyclohexane dimethanol diglycidyl ether.

Compounds 8 and 9 are available as EPALLOY® 5000/5001 and 5200, respectively, from CVC Thermoset Specialties. Compound 10 is available as Heloxy™ 107, from Hexion.

Exemplary cycloaliphatic epoxy compounds usable herein as the component (A) further include multifunctional epoxy compounds having three or more epoxy groups, which are encompassed by the following chemical formula 11:

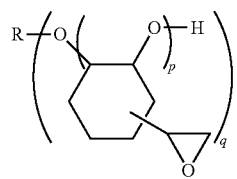

where R represents a group corresponding to a q-valent (q-hydric) alcohol R—(OH)q, except for removing —OH(s) in a number of q there from; p is an integer from 1 to 50; and q is an integer from 1 to 10. The numbers for p and q may be the same as or different from each other.

Additional cycloaliphatic epoxy compounds with three or more epoxy groups include compounds represented by the following structures 12 and 13:

(12)

(13)

where a, b, c, d, e, f, each independently denotes an integer of 0 to 30.

Component A may contain a single cycloaliphatic epoxy resin or a combination of different cycloaliphatic epoxy resins. Preferably, Component A is composed of a combination of cycloaliphatic epoxy resins with different functionality. In a preferred embodiment, Component A contains a combination of (a) a di-functional cycloaliphatic epoxy resin and (b) a multifunctional cycloaliphatic epoxy resin with functionality of greater than 2, such as a tri-functional or tetra-functional epoxy resin.

A cycloaliphatic epoxy resin having a low-viscosity can function as a reactive diluent when used in combination with another cycloaliphatic epoxy resin in Component A. Suitable low-viscosity compounds include cycloalkylene glycol diglycidyl ethers having a viscosity of 2500 mPa·s or less at 25° C., preferably, having a viscosity of 500 mPa·s or less at 25° C., as determined by Brookfield Viscometer. Such cycloalkylene glycol diglycidyl ethers include cyclohexanedimethanol diglycidyl ether, cyclohexanediol diglycidyl ether, and hydrogenated bisphenol-A epoxy resins. Examples of commercially available low-viscosity cycloaliphatic epoxy resins are Celloxide™ 2021P (3',4'-Epoxycyclohexane)methyl 3,4-epoxycyclohexylcarboxylate), Celloxide™ 2081 (3,4-Epoxycyclohexylmethyl-3',4'-epoxycyclohexanecarboxylate modified epsilon-caprolactone), Celloxide™ 8000 and 8010 (3',4'-Epoxycyclohexyl)-3,4-epoxycyclohexane) from Daicel Corporation; Araldite® CY 184 (hexahydrophthalic acid diglycidylester) from Huntsman Corp.; EPALLOY® 5000, 5001, and 5200 (previously mentioned), and Heloxy™ 107 (previously mentioned).

Epoxy-Amine Adduct

The epoxy-amine adduct (Component B) in the curable resin composition, has two or more epoxy groups per molecule and is obtained by a reaction of (i) an epoxy compound having two or more alicyclic epoxy groups per molecule with (ii) an amine compound having two or more amino groups per molecule.

As examples, the epoxy-amine adduct may have from 2 to 10, or 2 to 4 epoxy groups. The epoxy groups in the epoxy-amine adduct may be positioned at any positions, but are generally positioned at the molecular chain ends of the epoxy-amine adduct. In particular, the epoxy groups are generally positioned at both ends of the molecular chain of the epoxy-amine adduct when it is a linear epoxy-amine adduct. The epoxy group positions, however, are not limited thereto.

In one embodiment, the epoxy-amine adduct is represented by Formula II:

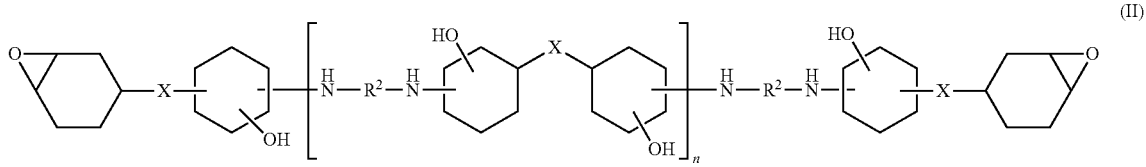

(II)

where X is, in each occurrence, independently selected from a single bond and a divalent group having at least one atom and is exemplified as with X in Formula (I); $R^2$ is a divalent organic group having a carbon atom at each bonding site with the nitrogen atom specified in the formula; and n is an integer of 1 or higher.

The epoxy compound (i) to be used in the epoxy-amine reaction may be selected from the cycloaliphatic epoxy compounds described above for Component A.

The amine compound (ii) serving as the starting material (or precursor) to form the epoxy-amine adduct is a polyamine compound having two or more amino groups ($-NH_2$), preferably, unsubstituted amino groups, per molecule. As used herein the term "amino group" refers to $-NH_2$ (unsubstituted amino group) unless otherwise specified, and the term "$-NH-$ group" does not include the unsubstituted amino group ($-NH_2$). The amine compound (ii) is represented by the general Formula III:

$$R^2(NH_2)_r \qquad (III)$$

where r is an integer of 2 or more, preferably, from 2 to 6, or from 2 to 5, more preferably, 2 or 3.

$R^2$ in Formula III represents an organic group (organic residue) having a valency of r and having a carbon atom at each bonding site with the nitrogen atom specified in the formula. $R^2$ is exemplified by r-valent linear or branched chain aliphatic hydrocarbon groups; r-valent cyclic aliphatic hydrocarbon groups; r-valent aromatic hydrocarbon groups; and r-valent groups each including two or more of these groups bonded directly or through a heteroatom-containing linkage group (divalent group).

The heteroatom-containing linkage group (divalent group) is exemplified by divalent groups each containing one or more heteroatoms (e.g., oxygen, nitrogen, and sulfur atoms), such as $-CO-$ (carbonyl group), $-O-$ (ether bond), $-CO-O-$ (ester bond), $-O-CO-O-$ (carbonate group), $-CO-NH-$ (amido group), $-CO-NR_a-$ (substituted amido group; where $R_a$ represents an alkyl group), $-NH-$, $-NR_b-$ (where $R_b$ represents an alkyl group), $-SO-$, and $-SO2-$; and divalent groups each including two or more of them linked to each other.

In some embodiments, the amine compound contains 2 or 3 amino groups. If the number of amino groups is greater than 6, it may be difficult to blend the epoxy-amine adduct (formed by reacting the amine compound with the epoxy compound) with other components in the resin composition.

The amine compound (ii) may have a number average molecular weight (Mn) from 80 to 15000, or from 100 to 12000, or from 200 to 10000. The number average molecular weight (Mn) can be measured by gel permeation chromatography (GPC).

A suitable amine compound is a polyetheramine represented by the following Formula IV:

(IV)

where p indicates the repetition number of the structure unit in the brackets and represents an integer of 1 or higher. The repetition number p is preferably from 1 to 100, including 1 to 70, and 1 to 30.

$R^3$ in Formula IV is selected from a divalent linear, branched chain, or cyclic aliphatic hydrocarbon group and a divalent group including one or more linear or branched chain aliphatic hydrocarbon groups and one or more cyclic aliphatic hydrocarbon groups linked to each other, and such divalent linear, branched chain, or cyclic aliphatic hydrocarbon group may have one or more substituents. Such substituents are exemplified by the substituents which the r-valent linear or branched chain aliphatic hydrocarbon groups may have. $R^3$ is preferably a C2-C6 linear or branched chain alkylene group, or a C2-C4 linear or branched chain alkylene group, particularly, ethylene, trimethylene, or propylene group.

$R^4$ in Formula IV is, in each occurrence, independently selected from a divalent linear, branched chain, or cyclic aliphatic hydrocarbon group; and a divalent group including one or more linear or branched chain aliphatic hydrocarbon groups and one or more cyclic aliphatic hydrocarbon groups linked to each other. The divalent linear, branched chain, or cyclic aliphatic hydrocarbon group may have one or more substituents. The substituents are exemplified by the substituents which the r-valent linear or branched chain aliphatic hydrocarbon group may have. $R^4$ is preferably a C2-C6 linear or branched chain alkylene group, or a C2-C4 linear or branched chain alkylene group, particularly, ethylene, trimethylene, or propylene group.

When p in Formula IV is an integer of 2 or more, $R^4$ in the respective pairs of brackets (i.e., $R^4$ in two or more occurrences) may be identical or different. When $R^4$ in two or more occurrences is different from each other, the structures in the respective pairs of brackets with p may be added (polymerized) in a random form or block form.

In Formula IV, $R^3$ and $R^4$ in each occurrence may be identical or different.

An exemplary amine compound of Formula IV is an amine-functionalized butyl ether elastomer having the following chemical structure 14:

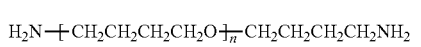

(14)

where n is degree of polymerization, and is an integer of 50-150. A specific example is Poly(Oxy-1,4-Butanediyl), Alpha-(4-Amino-Butyl)-Omega-(4-Aminobutoxy) with average molecular weight (MW) of about 10,000 g/mol.

The amine compound (ii) may also be a polyetheramine represented by the following Formula V:

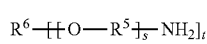

(V)

where s represents an integer of 1 or more, preferably 1 to 100, or 1 to 70, or 1 to 30; t indicates the number of the structure bonded to $R^6$ and represents an integer of 3 or more, preferably, 3 to 6, or 3 to 5, and in some embodiments, 3 or 4.

$R^5$ in Formula V is, in each occurrence independently, selected from a divalent linear, branched chain, or cyclic aliphatic hydrocarbon group; and a divalent group including one or more linear or branched chain aliphatic hydrocarbon groups and one or more cyclic aliphatic hydrocarbon groups linked to each other. The divalent linear, branched chain, or cyclic aliphatic hydrocarbon group is as described above for R2.

$R^6$ in Formula V represents an organic group having a valency of t and having a carbon atom at each bonding site with the oxygen atom specified in the formula. The organic group R6 is as described above for R2.

Specific examples of amine compounds encompassed by Formula V can be available as commercial products under the trade names of JEFFAMINE. Some of the JEFFAMINE products include the following examples:

JEFFAMINE D-230, polypropylene glycol 130 bis(2-aminopropyl ether, a difunctional primary amine characterized by repeating oxypropylene units in the backbone as shown by the structure 15 below:

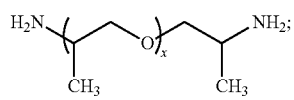

(15)

x ≈ 2.5

JEFFAMINE EDR-148, triethyleneglycol diamine, a symmetrical, unhindered diamine represented by the following structure 16:

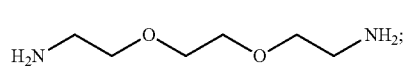

(16)

JEFFAMINE T-403, trimethylolpropane polyoxypropylene triamine, a trifunctional primary amine represented by the structure 17 below:

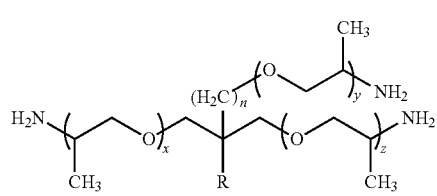

(17)

where x+y+z=5-6.

The epoxy-amine adduct disclosed herein may be produced by allowing the epoxy compound (i) and the amine compound (ii) to react with each other. More specifically, the alicyclic epoxy groups of the epoxy compound (i) and the amino groups of the amine compound (ii), upon reaction with each other, yield the epoxy-amine adduct (a reaction product).

A single epoxy compound or a combination of different epoxy compounds may be used to produce the epoxy-amine adduct according to the present disclosure. Likewise, a single amine compound or a combination of different amine compounds may be used to form the epoxy-amine adduct.

The reaction between the epoxy compound (i) and the amine compound (ii) may be allowed to proceed in the presence of, or in the absence of (i.e., without the use of), a solvent, for example, a hot-melt process.

The solvent is not limited, but is preferably one in which the epoxy compound (i) and the amine compound (ii) can be dissolved or dispersed uniformly. More specifically, the solvent may be selected from aliphatic hydrocarbons such as hexane, heptane, and octane; alicyclic hydrocarbons such as cyclohexane; aromatic hydrocarbons such as benzene, toluene, xylenes, and ethylbenzene; halogenated hydrocarbons such as chloroform, dichloromethane, and 1,2-dichloroethane; ethers such as diethyl ether, dimethoxyethane, tetrahydrofuran, and dioxane; ketones such as acetone, methyl ethyl ketone, and methyl isobutyl ketone; esters such as methyl acetate, ethyl acetate, isopropyl acetate, and butyl acetate; amides such as N,N-dimethylformamide and N,N-dimethylacetamide; nitriles such as acetonitrile, propionitrile, and benzonitrile; alcohols such as methanol, ethanol, isopropyl alcohol, and butanol; and dimethyl sulfoxide. Each of different solvents may be used alone or in combination.

The reaction between the epoxy compound (i) and the amine compound (ii) may be allowed to proceed in the presence of, or in the absence of, a catalyst. More specifically, the reaction is preferably allowed to proceed in the absence of a catalyst when a non-aromatic amine compound is used.

When a non-aromatic amine compound is used as the amine compound (ii), the catalyst may be used in an amount less than 1 part by weight (but greater than 0), per 100 parts by weight of the epoxy compound (i). In some embodiments, the amount of catalyst may be less than 0.5 part by weight, and in other embodiments, less than 0.3 part by weight, per 100 parts by weight of the epoxy compound (i).

When an aromatic amine compound is used as the amine compound (ii), the catalyst may be used in an amount from 0.1 to 10 parts by weight, or from 0.5 to 8 parts by weight, or from 1 to 5 parts by weight, per 100 parts by weight of the epoxy compound (i).

The molar ratio of the epoxy compound (i) to the amine compound (ii) to be subjected to the reaction is not limited, and may be adjusted so that the molar ratio of the alicyclic epoxy groups to the amino groups in the reaction is from 1 to 0.05, or from 0.95 to 0.10, or from 0.90 to 0.15. The epoxy-amine reaction, if performed at a molar ratio of alicyclic epoxy group/amino group of greater than 1, the excess epoxy compounds unreacted during the epoxy-amine reaction will be available as part of the epoxy composition in the curable composition disclosed herein.

The epoxy-amine reaction may be performed at a temperature (reaction temperature) from 30° C. to 250° C., or from 80° C. to 200° C., or from 120° C. to 180° C.

The epoxy-amine reaction may be performed for a time (reaction time) sufficient for all of the amine compounds to react. In some embodiments, the reaction time is from 0.2 to 20 hours, including from 0.5 to 10 hours, and from 1 to 5 hours.

The epoxy-amine reaction may be performed under any pressure, such as under normal atmospheric pressure, under pressure (under a load), or under reduced pressure. The reaction may also be performed in any atmosphere, such as an inert gas (e.g., nitrogen or argon) or air atmosphere.

The epoxy-amine reaction may be performed in any system selected from batch, semi-batch, and continuous flow systems without limitation. For example, the reaction, when performed in a batch system, may be performed typically by charging the epoxy compound (i), the amine compound (ii), and other optional components such as a solvent as needed in a batch reactor; and further heating and/or stirring the mixture as necessary.

Curing Agents and Catalysts

The curing agents and catalysts (Component C) suitable for use in the curable resin composition of the present disclosure may be selected from amine-based compounds, Lewis acid-amine complexes, anhydrides, and cationic catalysts. The term "amine-based" as used herein means containing one or more amine group in a compound's chemical formula. A combination of one or more curing agents and catalysts may be used depending on the choice of curing agent or catalyst selected.

The Lewis acid-amine complex (a curing catalyst) is a complex of a Lewis acid and an amine compound. The acid is combined with basic amines to form the Lewis acid-amine complexes.

Examples of the Lewis acid constituting the Lewis acid-amine complex includes conventional Lewis acids without particular limitation, for examples, include halogenated metals (e.g., titanium tetrachloride, tin tetrachloride, zirconium chloride, aluminum chloride, iron chloride, zinc chloride, copper chloride, antimony chloride, and zinc bromide or the like); boron halide compounds (e.g., boron trifluoride, boron trichloride, and boron tribromide or the like); phosphorus halide compounds (e.g., phosphorus pentafluoride and phosphorous pentachloride or the like); arsenic halide compounds (e.g., arsenic pentafluoride or the like); antimony halide compounds (e.g., antimony pentafluoride or the like); and metal triflate compounds (e.g., trimethylsilyl trifluoromethanesulfonate, scandium triflate, yttrium triflate, and zinc triflate or the like). In preferred embodiments, boron halide compounds are used for forming the complex.

Examples of the amine constituting the Lewis acid-amine complex include conventional amines without particular limitation, and examples thereof include ammonia, aliphatic amines, alicyclic amines, aromatic amines, and heterocyclic amines. More specific examples thereof include: ammonia; monomethylamine; dimethylamine; trimethylamine; monoethylamine; diethylamine; triethylamine; isopropylamine; n-butylamine; pentylamine; n-hexylamine; octylamine; dodecylamine; laurylamine; 4,4-diaminodiphenylamine; isophoronediamine; triethylenetetramine; benzylamine; piperidine; aniline; monoethanolamine; diethanolamine; triethanolamine; cyclohexylamine; morpholine; guanidine; N-alkylmorpholine; 1,8-diazabicyclo[5.4.0]undecene-7,6-dibutylamino-1,8-diazabicyclo[5.4.0]undecene-7; 1,5-diazabicyclo[4.3.0]nonene-5,1,4-diazabicyclo [2.2.2]octane; 1,5,7-triazabicyclo[4.4.0]dec-5-ene, and 7-methyl-1,5,7-triazabicyclo[4.4.0]dec-5-ene; pyridine; and N-alkylpiperidine. Among them, from the viewpoint of causing a curing reaction to proceed at low temperatures to suppress heat generation associated with the curing reaction, the aliphatic amine is preferable.

More specific examples of the Lewis acid-amine complex include $BF_3$·n-hexylamine, $BF_3$·monoethylamine, $BF_3$·benzylamine, $BF_3$·diethylamine, $BF_3$·piperidine, $BF_3$·triethylamine, $BF_3$·aniline, $BF_4$·n-hexylamine, $BF_4$·monoethylamine, $BF_4$·benzylamine, $BF_4$·diethylamine, $BF_4$·piperidine, $BF_4$·triethylamine, $BF_4$·aniline, $PF_5$·ethylamine, $PF_5$·isopropylamine, $PF_5$·butylamine, $PF_5$·laurylamine, $PF_5$·benzylamine, and $AsPF_5$·laurylamine. In a preferred embodiment, the amine complex of boron trifluoride, particularly, the aliphatic amine complex of boron trifluoride is used as a cure catalyst.

When selected, the total amount of Lewis acid-amine complex(es) (single complex or combination of different complexes) is in the range of 1-8 wt %, based on the total weight of the curable resin composition. Alternatively, the total amount Lewis acid-amine complex(es) may be 0.5 to 20 parts by weight, or 1 to 15 parts by weight based on 100 parts by weight of the total amount of epoxy component (A) and epoxy-amine adduct component (B), i.e., the combined amount of A+B, in the curable resin composition.

Anhydrides for used as curing agents may be acid anhydrides. Such acid anhydrides may be selected from those conventionally used as curing agents for epoxy resins. The acid anhydride is preferably one which is liquid at room temperature, such as methyltetra-hydrophthalic anhydride, methylhexahydrophthalic anhydride, dodecenylsuccinic anhydride, methyl-endomethylene-tetrahydrophthalic anhydride, and mixtures thereof. Alternatively, an acid anhydride that is solid at room temperature may be employed within a range not adversely affecting the homogeneous blending of the epoxy resins in the composition. Suitable solid acid anhydride includes phthalic anhydride, tetrahydrophthalic anhydride, hexahydrophthalic anhydride, methyl nadic anhydride, carbic anhydride, methylcyclohexenedicarboxylic anhydride, and mixtures thereof.

When selected, the curable resin composition may contain the anhydride curing agent in an amount of 50 to 150 parts by weight, or 55 to 140 parts by weight, per 100 parts by weight of the total amount of the epoxy component (A) and the epoxy-amine adduct (B). Alternatively, the amount of anhydride may be in the range of 20-40 wt % based on the total weight of the curable resin composition. More generally, the curable resin composition preferably contains the anhydride curing agent in an amount sufficient to cause crosslinking of epoxy resins, and more specifically, in an amount sufficient to give an acid anhydride equivalent of 0.5 to 1.5 per one equivalent of epoxy group in the epoxy component (A) and the epoxy-amine adduct (B).

When acid anhydride is selected, it is preferably used in combination with a curing accelerator for acid anhydride. The curing accelerator is a compound having the function of accelerating a curing reaction upon curing of epoxy resins by the action of the acid anhydride.

Such curing accelerator is not limited, and may be a diazabicycloun-decene curing accelerator or a phosphorus curing accelerator. Such curing accelerator may be used alone or in combination as a mixture with one or more other curing accelerators for epoxy resins, such as tertiary or quaternary amines.

Examples of diazabicycloun-decene curing accelerator include 1,8-diazabicyclo-[5.4.0]-undecene-7 (DBU), represented by the chemical structure (18) below, and salts thereof.

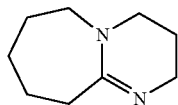

(18)

1,8-diazabicyclo[5.4.0]undecene-7 (DBU)

Examples of other curing accelerators usable with acid anhydride as the catalyst herein include tertiary amines such as benzyldimethylamine and 2,4,6-tris (dimethylaminomethyl)phenol; imidazoles such as 2-ethyl-4-methylimidazole and 1-cyanoethyl-2-ethyl-4-methylimidazole; organic phosphine compounds such as triphenylphosphine; tertiary amine salts; quaternary ammonium salts; phosphonium salts; and metal salts such as tin octanoate and zinc octanoate.

The total amount of curing accelerator(s) in the curable resin composition may be in the range of 0.05 to 5 parts by weight, or 0.1 to 3 parts by weight, or 0.2 to 3 parts by weight, or 0.25 to 2.5 parts by weight, per 100 parts by weight of the total amount of Components A and B. The diazabicycloundecene or phosphorus curing accelerator preferably constitutes at least 50% by weight of the total amount of curing accelerators when used together with other accelerators.

The catalyst for use in the curable resin composition may be a cationic-polymerization initiator. The cationic-polymerization initiator is an initiator that releases, through heating, a substance initiating cationic polymerization.

Exemplary cationic-polymerization initiators include aryldiazonium salts, aryliodonium salts, arylsulfonium salts, and blocked acids. Specific examples include triarylsulfonium hexafluoroantimonate; 4-hydroxyphenyl)methyl(1-naphthylmethyl)sulfonium, hexafluoroantimonate; 4-hydroxyphenyl)methyl(2-methylbenzyl) sulfonium, hexafluoroantimonate; benzyl(4-hydroxyphenyl)methylsulfonium, hexafluoroantimonate; and benzyl(4-hydroxyphenyl)sulfonium, hexafluoroantimonate; ammonium hexafluoroantimonate; and ammonium salt of triflic acid.

When selected, the cationic catalyst may present in an amount of 0.01 to 15 parts by weight, or 0.05 to 12 parts by weight, or 0.1 to 10 parts by weight, per 100 parts by weight of the total amount of Components A and B. Alternatively, the amount of cationic catalyst may be in the range of 0.1-2 wt % based on the total weight of the curable resin composition.

Amine-based curing agents for reacting with the epoxy resins in the resin composition include latent amine curing agents, which are activated at elevated temperatures (e.g., temperature above 150° F. (65° C.). The term "amine-based" in reference to a curing agent means containing one or more amine group(s) in the curing agent's chemical formula. Examples of suitable latent amine curing agents include dicyandiamide (DICY), guanamine, guanidine, aminoguanidine, and derivatives thereof. The amine-based curing agent may be present in an amount within the range of 1-5 wt % based on the total weight of the curable resin composition. A curing accelerator may be used in conjunction with the latent amine curing agent to promote the curing reaction between the epoxy resins and the amine-based curing agent. Suitable accelerators include imidazole, dihydrazide, and aliphatic polyamines. Such curing accelerator may be present in an amount within the range of 0.5-8 wt %, based on the total weight of the curable resin composition.

Suitable curing accelerators for latent amine curing agents include alkyl and aryl substituted ureas (including aromatic or alicyclic dimethyl urea); and bisureas based on toluenediamine or methylene dianiline. One example of bisurea is 4,4'-methylene bis(phenyl dimethyl urea) (commercially available as Omicure® U-52 or CA 152 from CVC Chemicals), which is a suitable accelerator for dicyandiamide. Another example is 2,4-toluene bis(dimethyl urea) (commercially available as Omicure® U-24 or CA 150 from CVC Chemicals). Another example is Omicure® U-35M/U-35, a cycloaliphatic substituted urea, commercially available from CVC Chemicals. Further substituted urea example is Technicure® IPDU-8, which is N-3-(dimethylamino) carbonylaminomethyl-3,5,5-trimethyl-cyclohexyl-N,N-dimethyl-urea, commercially available from A&C Catalyst.

Suitable aliphatic polyamines include Ancamine® 2014, Ancamine® 2337S (aliphatic amine phenolic resin reaction product), Ancamine® 2441 (Cycloaliphatic amine); suitable dihydrazides include adipic dihydrazide (ADH), isophthalic dihydrazide (IDH), valine dihydrazide (VDH); and suitable imidazoles include 2-Methylimidazoleazine and Technicure LC-80 (encapsulated modified imidazole). These accelerators can be used in combination with DICY, or used alone.

Ceramic Microspheres

Ceramic microspheres (Component D) are added to the curable resin composition to improve the surface smoothness of the surfacing film formed from such resin composition. In one embodiment, hollow, ceramic microspheres made of an inert silica-alumina ceramic material are used. The ceramic microspheres may have a crush strength of over 60,000 psi, a dielectric constant of about 3.7-4.6, a softening point in the range of 1000° C.-1100° C. (or 1832° F.-2012° F.), and particle diameters ranging from 0.1 micron to 50 microns, or 1-50 microns. Such particle diameters can be determined by Scanning Electron Microscopy (SEM). The high softening point of the ceramic microspheres enables them to be nonabsorbent to solvents, non-flammable, and highly resistant to chemicals. Microspheres having diameters ranging from about 0.1 to about 20 microns, and preferably from about 1 to about 15 microns have been found to be particularly suitable. An example of commercially available ceramic microspheres which are particularly suitable for use in the present surface film composition are sold by Zeelan Industries, Inc. under the trade name Zeeospheres®, for example, G-200, G210 and W-200. These are hollow, silica-alumina spheres with thick walls, odorless, and light gray in color. In certain embodiments, the amount of ceramic microspheres is at least 10 wt %, preferably at least 15 wt %, based on the total weight of the curable resin composition. In some embodiments, the amount of ceramic microspheres may be within the range of 10-30 wt % based on the total weight of the curable resin composition.

Flow Control Agent

The flow control agent (Component E) in the form of inorganic particles, e.g. powder), is added to the curable resin composition as a rheology modifying component to control the flow of the resinous composition and to prevent agglomeration therein. Suitable inorganic fillers that may be used in the curable resin composition include talc, mica, calcium carbonate, alumina, and silica. In one embodiment, hydrophobic fumed silica (e.g. Cab-O-Sil TS-720) is used as the inorganic filler. The amount of inorganic filler may be within the range of 1-8 wt % based on the total weight of the curable resin composition.

Pigments and Dyes

Pigments and/or dyes for adding color to the resinous systems may be added to the curable resin composition. Examples include, but are not limited to, red iron oxide, green chromium, carbon black, and titanium oxide. In preferred embodiments, a titanium oxide ($TiO_2$) white pigment is added to the curable resin composition. Titanium dioxide is commercially available in two crystal structures—anatase and rutile. Rutile $TiO_2$ pigments are preferred because they scatter light more efficiently, are more stable and are more durable than anatase pigments. Among them, rutile $TiO_2$ with particle size between 0.2 and 0.3 microns in diameter is most preferred, such as Ti-Pure TS-6200, or R-902+, or R-706 pigment from DuPont (now Chemours). In other embodiments, carbon black pigment is added.

Additional Toughening Agents

In addition to the epoxy-amine adduct described above, one or more secondary toughening agents may be added to the curable resin composition to work synergistically to maximize the toughness performance of the curable composition disclosed here. The additional toughening agents are selected from: (i) polyvinyl acetal resins (PVB); (ii) polyvinyl formal resins; (iii) a thermoplastic copolymer of polyethersulfone (PES) and polyetherethersulfone (PEES); and (iv) core-shell rubber (CSR) particles; and combinations thereof.

Suitable polyvinyl acetal resins include vinyl butyral acetal polymers (PVB) having number average molecular weight (Mn) in the range of 30,000 to 45,000. Mn can determined by Gel Permeation Chromatography (GPC) using polystyrene molecular weight standard.

Suitable polyvinyl formal resins include Vinylec (polyvinyl formal) or Vinylec-C (poly vinylformal-co-acrylic acid) polymers having Mn in the range of 44,000 to 134,000.

The amount of additional toughening agent(s) may be in the range of 1-15 wt % based on the total weight of the curable resin composition.

The copolymer of PES and PEES is as described in U.S. Pat. No. 7,084,213 (assigned to Cytec Technology Corp.).

The core-shell rubber (CSR) particles may be any of the core-shell particles where a soft core is surrounded by a hard shell. Preferred CSR particles are those having a polybutadiene rubber core or styrene-butadiene rubber core and a polyacrylate shell. CSR particles having a hard core surrounded by a soft shell may also be used, however. The CSR particles may be supplied as a 25-40 wt % of CSR particles dispersed in a liquid epoxy resin. CSR particles having particle size of 300 nm or less are preferred. Such particle size can be determined by Scanning Transmission Electron Microscopy (STEM).

CSR particles having rubber cores and polyacrylate shells are available commercially from Kaneka Texas Corporation (Houston, Tex.) under the tradenames Kane Ace® MX. It is preferred, but not required, that the core-shell rubber particles be added to the curable resin composition as a suspension of particles in a suitable liquid epoxy resin. Kane Ace® MX 553 and MX 554 are suspension of 25-30% by weight core-shell rubber particles in alicyclic epoxy resin and are suitable source of core-shell rubber particles. Kane Ace® MX 411 is a suspension of 25% by weight core-shell rubber particles in MY 721 epoxy resin and is a suitable source of core-shell rubber particles. Kane Ace® MX 120, MX 125, or MX 156, which contains 25-37 wt % of the same core-shell rubber particles dispersed in D.E.R.™ 331 resin, is also a suitable source of core-shell rubber particles. Other suitable source of core-shell rubber particles, such as MX 257, MX 215 and MX 451, may also be used. Another commercial source of core-shell rubber particles is Paraloid™ EXL-2691 from Dow Chemical Co. (methacrylate-butadiene-styrene CSR particles with average particle size of about 200 nm).

Conductive Materials

Conductive materials in particulate form, e.g., particles or flakes, may also be added to the curable resin composition to impart electrical conductivity to the finished surfacing film formed from the curable resin composition. The amount of conductive materials may be in the range of 0.5-3 wt % for carbon-based conductive particles, or greater than 35 wt % for metal-based conductive particles based on the total weight of the curable resin composition.

Examples of suitable conductive materials include metals, in the form of flakes or particles, such as silver, gold, nickel, copper, aluminum, and alloys thereof. Carbon-based nano-sized materials, such as carbon nano-tubes (single-wall nano tubes or multi-wall nano tubes), carbon nano-fibers, and graphene flakes can also be used as conductive constituents to impart the electrical conductivity to the resin film. The nano-fibers may have diameters ranging from 70 and 200 nanometers and a length of about 50-200 microns. The nano-tubes may have an outer diameter of about 10 nanometers, length of about 10,000 nanometers, and an aspect ratio (L/D) of about 1000.

UV Stabilizers or Absorbers

One or more UV stabilizers or absorbers may be added to the curable resin composition. The total amount of UV stabilizer(s) may be in the range of 0.5-5 wt % based on the total weight of the resin composition.

Examples include phenolic antioxidants such as butylated hydroxytoluene (BHT); Pentaerythritol Tetrakis(3-(3,5-di-tert-butyl-4-hydroxyphenyl)propionate; 2-hydroxy-4-methoxy-benzophenone; 2,4-bis(2,4-dimethylphenyl)-6-(2-hydroxy-4-octyloxyphenyl)-1,3,5-triazine; 3,5-di-tert-butyl-4-hydroxybenzoic acid, n-hexadecyl ester; liquid hindered amine light stabilizer (HALS) such as 2-(2H-benzotriazol-2-yl)-4,6-ditertpentylphenol, and methyl 1,2,2,6,6-pentamethyl-4-piperidyl sebacate. Decanedioic acid, bis(2,2,6,6-tetramethyl-1-(octyloxy)-4-piperidinyl ester and 2-[4-[(2-Hydroxy-3-tridecyloxypropyl)oxy]-2-hydroxyphenyl]-4,6-bis(2,4-dimethylphenyl)-1,3,5-triazine may also be used as suitable UV stabilizers.

Table 1 below shows various embodiments of the curable resin composition for forming the surfacing material of the present disclosure. Amounts are shown in weight percentage (wt %) based on the total weight of the entire composition.

Table 1A shows the components for forming the epoxy-amine adduct (Component B) in each of the embodiments shown in Table 1. The embodiments in Table 1A correspond to the embodiments in Table 1. The components shown in Table 1A are pre-reacted to form the epoxy-amine adduct prior to being incorporated into the curable resin composition of Table 1. Amounts are indicated in weight percentage (wt %) based on the total weight of all components for the adduct.

organic solvents may also be added to the mixture, as necessary, to facilitate the mixing of the components. A surfacing film is subsequently formed from the surface film composition using conventional film-forming processes.

TABLE 1

| Components | \multicolumn{8}{c}{Embodiments} |
|---|---|---|---|---|---|---|---|---|
| | 1 | 2 | 3 | 4 | 5 | 6 | 7 | 8 |
| Cycloaliphatic Epoxy (A) | 5-15% | 5-15% | 5-15% | 5-15% | 5-15% | 5-15% | 5-15% | 5-15% |
| Epoxy-amine adduct (B) | 15-55% | 15-55% | 15-55% | 15-55% | 15-55% | 15-55% | 15-55% | 15-55% |
| Curing agents/Catalysts (C.) | | | | | | | | |
| Lewis acid-amine complex | 1-8% | | | | | | 1-8% | |
| Acid anhydride | | | | | 20-40% | | | |
| Cationic catalyst | | | | | | 0.1-2% | | |
| Dicyandiamide (DICY) | | 1-5% | 1-5% | 1-5% | | | | 1-5% |
| Accelerators | | | | | | | | |
| Accelerator for acid anhydride (Amine salt) | | | | | 0.5-3% | | | |
| Bisureas (for DICY) | | 1-5% | 1-5% | | | | | 1-5% |
| Polyamine | | 0.6-8% | | 0.6-8% | | | | |
| Dihydrazide | | | 1-10% | | | | | 1-10% |
| Imidazole | | | | 1-10% | | | | |
| Ceramic microspheres (D) | 10-30% | 10-30% | 10-30% | 10-30% | 10-30% | 10-30% | 10-30% | 10-30% |
| Flow control agent (E) | | | | | | | | |
| Fumed silica | 2-8% | 2-8% | 2-8% | 2-8% | 2-8% | 2-8% | 2-8% | 2-8% |
| Additional Toughening Agents | | | | | | | | |
| Polyvinyl acetal resin | | | 3-15% | | | | 3-15% | |
| Polyvinyl formal resin | | | | 3-15% | | | | |
| PES-PEES co-polymer | | | | | | | | 1-5% |
| CSR particles | | | | | | | | 1-6% |
| Pigments | | | | | | | | |
| TiO$_2$ | 5-30% | 5-30% | 5-30% | 5-30% | 5-30% | 5-30% | 5-30% | 5-30% |
| UV stabilizers/additives | | | | | | | | |
| Phenolic antioxidants | 0.5-3% | | 0.5-3% | 0.5-3% | 0.5-3% | 0.5-3% | 0.5-3% | |
| Triazine or triazole UV absorbers | 0.5-3% | | 0.5-3% | 0.5-3% | 0.5-3% | 0.5-3% | 0.5-3% | |
| Liquid hindered amines (HALS) | 0.5-3% | | 0.5-3% | | | | 0.5-3% | |
| Conductive Additives | | | | | | | | |
| Ag or Cu flakes | | | | | | | 40-70% | |
| Carbon black particles | 0.5-5% | | 0.5-5% | | | | | |

TABLE 1A

Epoxy-Amine Adduct

| Components | \multicolumn{8}{c}{Embodiments} |
|---|---|---|---|---|---|---|---|---|
| | 1 | 2 | 3 | 4 | 5 | 6 | 7 | 8 |
| Epoxy-amine adduct (B) | | | | | | | | |
| Di-functional Alicyclic Epoxy resin (liquid) | 15-35% | 15-35% | 15-35% | 15-35% | 15-35% | 15-35% | 15-35% | 15-35% |
| Multi-functional Alicyclic Epoxy resin (solid) | 40-65% | 40-65% | 40-65% | 40-65% | 40-65% | 40-65% | 40-65% | 40-65% |
| Multi-functional Alicyclic Epoxy resin (Liquid) | 10-25% | | 10-25% | | | | | 10-25% |
| Amine-terminated Elastomer | 10-40% | 10-40% | 10-40% | 10-40% | 10-40% | 10-40% | 10-40% | 10-40% |
| Total | ~100% | ~100% | ~100% | ~100% | ~100% | ~100% | ~100% | ~100% |

The components of the surfacing film composition may be added to a mixing vessel equipped for mixing, heating, and/or cooling the components. Furthermore, one or more The resin layer formed from the curable resin composition disclosed herein may be prepared by a hot-melt process or a solution process. For the hot-melt process, a resin film is formed from the curable resin composition without a solvent. For the solution process, one or more solvent(s) is/are added to the curable resin composition to achieve a workable solid content suitable for coating, for example, a solid content of 65% to 85%, preferably, 70% to 80%. Examples of such solvents may include, but are not limited to, methyl ethyl ketone (MEK), acetone, dimethylacetamide, and N-methylpyrrolidone.

To facilitate the handling of the resin layer as a surfacing material, the resin layer may be combined with a carrier by pressing the carrier into the resin layer under light pressure to embed the carrier into the resin film. Such carrier may be selected from: a nonwoven veil or woven fabric made of thermoplastic polymer fibers, glass fibers, or carbon fibers or combination thereof; knitted veil or fabric composed of polymeric fibers, and the like. Examples of metallic screens or foils may include expanded metallic screens or foils, and metal coated veils. Such screens and foils may comprise copper, aluminum, silver, nickel, and alloys thereof. Examples of non-woven mats, woven or knit backings may include carbon mats, polymer mats, and metal coated carbon, glass, or polymer glass veils. The non-woven mat, woven or knit backing may be coated with copper, aluminum, silver, nickel, and alloys thereof.

The resin layer to be used as the surfacing layer (with or without a carrier) may have an areal weight of less about 500 gsm, for example, about 50 gsm to about 250 gsm, or 50-200 gsm in total. The carrier may have an areal weight of about 5 gsm to 20 gsm.

As discussed above, the surfacing material may consist of a single resin layer, and optionally, a carrier embedded therein. In other embodiments, the surfacing material is a multilayered structure, which includes the resin layer formed from the curable resin composition described above and an electrically conductive layer. When such conductive layer is incorporated into the surfacing material, lighting strike protection (LSP) can be achieved. The conductive layer may be a nonporous, continuous layer of metal or non-metallic conductive material with a thickness of less than about 102 µm, in some embodiments, in the range of about 5 µm to about 75 µm, or 10 µm to 40 µm, or 16 µm to 38 µm. Alternatively, the conductive layer may be a porous layer, for example, a metal screen or a perforated metal foil. Such metal screen may have an areal weight within the range of about 60 gsm to about 820 gsm, or 60 gsm to about 350 gsm. If the conductive layer is a perforated metal foil, it may have a thickness within the range of about 10 µm to about 75 µm.

When the conductive layer is a metal layer, the metal may be selected from copper, aluminum, bronze, titanium, and alloys thereof. The conductive layer may be formed of a non-metallic material with intrinsic electrical conductivity such as carbon in sheet form, including graphene sheet and carbon-nanotube (CNT) paper. A specific example of CNT paper is flexible CNT Bucky paper.

The curable resin composition may be applied to one or both surfaces of the conductive layer (e.g. solid metal foil) to form a bi-layer or a tri-layer structure, respectively, using conventional coating techniques. Alternatively, the conductive surfacing material may be fabricated by laminating a pre-fabricated resin film to one side of a conductive layer to form a bi-layer structure, or laminating two pre-fabricated resin films onto opposite surfaces of the conductive layer to form a tri-layer structure. The conductive layer may also be embedded into the resin layer formed from the curable resin composition.

BRIEF DESCRIPTION OF THE DRAWINGS

FIG. 1 shows a surfacing material composed of resin layer 10 and electrically conductive layer 11 laminated to a composite substrate 20, which may be a prepreg layup.

FIG. 2 shows a surfacing material composed of a resin layer 13 having an electrically conductive layer 14 embedded therein laminated to a composite substrate 20, which may be a prepreg layup.

Figure 1:
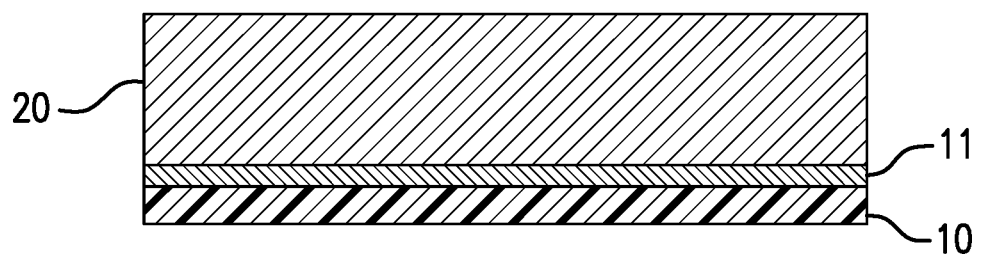
FIG. 1 shows a conductive surfacing material laminated to a composite substrate, according to one embodiment.
Figure 2:
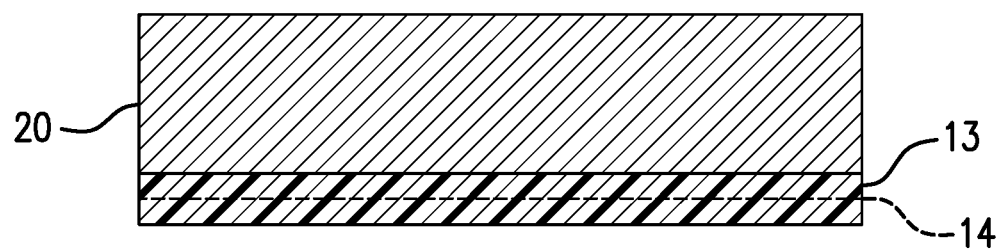
FIG. 2 shows a conductive surfacing material laminated to a composite substrate, according to another embodiment.

The resin layer formed from the curable resin composition disclosed herein may be used to form a multi-layered surfacing material that includes a self-releasable layer and a conductive layer so as to form a mold-releasable surfacing material as disclosed in WO 2017/112766 A1 (published on 29 Jun. 2017) and corresponding US2018370083 A1 (published on 27 Dec. 2018). The UV stable features of the surfacing material disclosed herein are expected to significantly reduce tool preparation time, and eliminate the use of in-mold UV protection primer, thereby increasing the manufacturing rate and significantly lowering the manufacturing cost for fabricating composite parts.

The resin layer formed from the curable resin composition disclosed herein may be used to form a multi-layered surfacing material that includes a barrier film. Such multi-layered surfacing material may be composed of a barrier film sandwiched between two resin films, which are formed from the curable resin composition disclosed herein. Such multi-layered surfacing material may further include a conductive layer adjacent to the barrier film and between the two resin films. The barrier film is as described in WO 2017/095810 (published on 8 Jun. 2017).

The barrier film is formed of a polymeric material that is impermeable to liquid. Preferred properties for the polymeric material include high Tg, e.g., within 140° C.-170° C.), or 150° C.-162° C., as measured by DSC at a ramp rate of 10° C./minute according to ASTM D3418. Another preferred property is crystallinity of 3%-50%, including 10%-40%, or 20%-30%, as measured by DSC at a ramp rate of 10° C./minute according to ASTM D3418. As examples, the barrier film may be made of a thermoplastic material selected from: polyaryletherketone (PAEK) polymers, polyamide, polyimide, polyetherimide (PEI), polyamide-imide, polyester and combinations thereof. In some embodiments, the composition of the barrier film contains a PAEK polymer selected from: poly (ether ketone) ("PEK"), poly (ether ether ketone) ("PEEK"), poly (ether ketone ketone) ("PEKK"), poly (ether ketone ether ketone ketone) ("PEKEKK"), poly (ether ether ketone ether ether ketone) ("PEEKEEK"), poly (ether diphenyl ketone) ("PEDK"), poly (ether diphenyl ether ketone) ("PEDEK"), poly (ether diphenyl ether ketone ketone) ("PEDEKK"), and poly (ether ketone ether naphthalene) ("PEKEN"), and combinations thereof.

A multi-layered surfacing material having such fluid barrier film is particularly useful for a composite sandwich panel containing a porous core. Such composite sandwich panels find widespread use in aerospace structural components because of the high stiffness-to-weight and strength-to-weight ratios. Composite sandwich panels typically have composite skins co-cured with adhesives to the core through autoclave processing. The core material may take a variety of forms, such as a lightweight honeycomb, rigid foam, paper or wood. An exemplary configuration of a composite sandwich panel with a honeycomb core includes a first prepreg skin and a second prepreg skin adhesively bonded to a honeycomb core, and an outermost surfacing material laminated to each of the prepreg skin. Each prepreg skin may be composed of several curable prepreg plies. The outermost surfacing material may be a multi-layered structure having a barrier film incorporated therein.

The surfacing material disclosed herein is designed to be co-cured with a fiber-reinforced, resin matrix composite substrate at a temperature above 150° F. (65° C.), more particularly, within the range of 120° C.-185° C. The fiber-reinforced, resin matrix composite substrate is composed of reinforcement fibers which have been impregnated or infused with a matrix resin. The matrix resin may include one or more thermoset resins such as epoxy resins. The composite substrate may be in the form of a prepreg ply or a prepreg layup. The prepreg ply is composed of reinforcement fibers in the form of a fabric or directionally aligned, continuous fibers that have been impregnated with a resin, e.g. epoxy resin. The directionally aligned fibers may be unidirectional or multi-directional fibers. The prepreg layup is composed of a plurality of prepreg plies arranged in a stacking sequence. In general, the uncured surfacing material may be applied onto a fiber-reinforced, resin matrix composite substrate, which is in an uncured or partially cured state, followed by co-curing to form a fully-cured composite structure having a thermoset (hardened) surfacing layer bonded thereto as an outermost layer. In an embodiment, the surfacing material is applied onto a mold surface, then a plurality of prepreg plies are laid up onto the surfacing material in a stacking arrangement. The tool surface may be planar or non-planar (e.g. curved surface or some other 3-dimensional configuration). Alternatively, the prepreg plies may be laid up onto the mold surface first and then the surfacing material is applied onto the prepreg layup. Heat and pressure are then applied to co-cure the prepreg layup and the surfacing material into a final, harden composite structure with a selected shape.

The surfacing material of the present disclosure may be in the form of a flexible tape, which is lightweight and is configured for an automated placement process such as Automated Tape Laying (ATL) or Automated Fiber Placement (AFP), referred hereafter as "surfacing tape". The surfacing tape may have a width of about 0.125 in to about 12 in (or about 3.17 mm to about 305 mm). In one embodiment, the surfacing tape has a width of about 0.125 in to about 1.5 in (or about 3.17 mm to about 38.1 mm), including about 0.25 in to about 0.50 in (or about 6.35 mm to about 12.77 mm). In another embodiment, the surfacing tape has a width of about 6 in to about 12 in (or about 152 mm to about 305 mm). The length of the tape is continuous or is very long relative to its width, for example, at least 10 times its width, more specifically, 100-100,000 times its width. In continuous form, the surfacing tape can be wound up into a roll for storage before its application in an automated process.

The continuous surfacing tape may be incorporated into an ATL/AFP process that automatically lays down continuous, resin-impregnated prepreg tapes to form the composite structure. Each prepreg tape is composed of unidirectional reinforcement fibers, e.g. carbon fibers, which are embedded in a curable resin matrix, e.g. epoxy-based matrix. When the surfacing tapes are used in such automated placement process, the surfacing tapes are laid down first onto the mold surface. The tapes are dispensed side by side to create a surfacing layer of desired width and length. Subsequently, individual prepreg tapes are laid down onto the surfacing layer and then additional layers are built onto a prior layer to provide a prepreg layup with a desired thickness. The subsequent tapes may be oriented at different angles relative to prior tapes. All tapes are laid down at high speed, using one or more numerically controlled placement heads to dispense, clamp, cut and restart each tape during placement. Such ATL/AFP process is conventionally used for the manufacturing of large composite aerospace structures, such as fuselage sections or wing skins of aircrafts. This automated placement process eliminates some of the intermediate processing steps that are typical in the conventional methods of manually applying large surfacing films onto an existing prepreg layup.

EXAMPLES

The following examples serve to give specific embodiments of the surfacing films formed according to the present disclosure but are not meant in any way to limit the scope of the present disclosure.

Eight surfacing films were prepared based on the formulations shown in Table 2-9. For comparison, a comparative surfacing film was prepared according to the formulation shown in Table 11.

Example 1

A curable resin composition for forming a surfacing film was prepared according to Table 2. The epoxy-amine adduct (B) was prepared by reacting 8.8 g (grams) of 3',4'-Epoxycyclohexane) methyl 3,4-epoxycyclohexylcarboxylate with 20.6 g of poly[(2-oxiranyl)-1,2-cyclohexanediol] 2-ethyl-2 (hydroxymethyl)-1,3-propanediol ether and 8.8 g of polytetrahydrofuranamine (elastomer) at 150° C. for 1 hour.

Each epoxy-amine adduct was prepared by adding the components into a mixing vessel and mixing the components using a high-speed shear lab mixer. The epoxy resins and the amine compound were added to the mixing vessel, and the mixture was heated up gradually under shear mixing (1000-3000 rpm) to the designated adduct reaction temperature and held at the reaction temperature for specified time period. After the hold time, the reaction product was cooled down to ~30° C.-40° C., and then the epoxy-amine adduct was discharge for further use in preparing the curable composition of Table 2.

TABLE 2

| Components | wt % |
|---|---|
| Cycloaliphatic Epoxy (A) | |
| (3',4'-Epoxycyclohexane)methyl 3,4-epoxycyclohexylcarboxylate | 4.4 |
| Poly[(2-oxiranyl)-1,2-cyclohexanediol] 2-ethyl-2 (hydroxymethyl)-1,3-propanediol ether | 4.4 |
| Epoxy-amine adduct (B) | 38.2 |
| Curing agent/Catalysts (C) | |
| Boron trifluoride ethylamine complex | 4.4 |
| Ceramic microspheres (D) | 16.1 |
| Flow control agent (E) | |
| Fumed silica | 5.9 |
| Pigments | |
| TiO$_2$ | 22 |
| UV stabilizers/additives | |
| Phenolic antioxidant: Pentaerythritol Tetrakis(3-(3,5-di-tert-butyl-4-hydroxyphenyl)propionate | 1.1 |

TABLE 2-continued

| Components | wt % |
|---|---|
| Triazine UV absorber: 2-[4-[(2-Hydroxy-3-dodecyloxypropyl)oxy]-2-hydroxyphenyl]-4,6-bis(2,4-dimethylphenyl)-1,3,5-triazine | 1.2 |
| Liquid hindered amine (HAL): Decanedioic acid, bis(2,2,6,6-tetramethyl-1-(octyloxy)-4-piperidinyl ester | 1.2 |
| Conductive Additives | |
| Carbon black particles | 0.5 |
| TOTAL (wt %) | 100 |

A surfacing film was prepared by adding the components disclosed in Table 2 into a mixing vessel and mixing the components using a high-speed shear lab mixer. The epoxy resins (A) and epoxy-amine adduct (B) were added first. Methyl ethyl ketone (MEK) solvent was added, as necessary, to control the viscosity of above mix to about 80 wt % solids. The temperature of the composition was kept below about 70° C. during mixing.

To form a surfacing film, the prepared composition was strained, de-aired, and deposited as a resin film. Straining was performed through a filtration media (nylon mesh screen). De-airing was performed such that the solid content of the composition was about 80 wt %. The strained and de-aired composition was then coated as a film having a film weight of about 50-200 gsm by a film coater, and then dried so as to achieve less than 2% by weight volatiles. A carrier (glass or polyester type carrier with areal weight of 10-20 gsm) was pressed into the resin film under light pressure to embed the carrier to the film.

Example 2

A curable resin composition for forming a surfacing layer was prepared according to Table 3. The epoxy-amine adduct (B) was prepared by reacting 9.6 g of epoxidized Hydrogenated Bisphenol A with 22.5 g of poly[(2-oxiranyl)-1,2-cyclohexanediol] 2-ethyl-2 (hydroxymethyl)-1,3-propanediol ether and 9.6 g of polytetrahydrofuranamine (elastomer) at 135° C. for 1.5 hour. The epoxy-amine adduct was prepared with the same procedure as described for the epoxy-amine adduct in Example 1.

TABLE 3

| Components | wt % |
|---|---|
| Cycloaliphatic Epoxy (A) | |
| Epoxidized Hydrogenated Bisphenol A | 4.8 |
| Poly[(2-oxiranyl)-1,2-cyclohexanediol] 2-ethyl-2 (hydroxymethyl)-1,3-propanediol ether | 4.8 |
| Epoxy-amine adduct (B) | 41.7 |
| Curing agent/Catalysts (C) | |
| Dicyandiamide (DICY) | 2.6 |
| Aliphatic Bisureas (for DICY) | 2.2 |
| Aliphatic polyamines (Ancamine 2014FG) | 3.9 |
| Ceramic microspheres (D) | 14.4 |
| Flow control agent (E) | |
| Fumed silica | 6.4 |
| Pigments | |
| TiO$_2$ | 19.2 |
| TOTAL (wt %) | 100 |

A curable surfacing film having a carrier embedded therein and areal weight of about 150 gsm was formed from the resin composition of Table 3 as described in Example 1. The carrier used was a 10 gsm glass scrim.

Example 3

A curable resin composition for forming a surfacing layer was prepared according to Table 4. The epoxy-amine adduct (B) was prepared by reacting 8.6 g of epoxidized hydrogenated Bisphenol A with 19.9 g of poly[(2-oxiranyl)-1,2-cyclohexanediol] 2-ethyl-2 (hydroxymethyl)-1,3-propanediol ether and 8.6 g of polytetrahydrofuranamine (elastomer) at 135° C. for 1.5 hour. The epoxy-amine adduct was prepared with the same procedure as described in Example 1.

TABLE 4

| Components | wt % |
|---|---|
| Cycloaliphatic Epoxy (A) | |
| Epoxidized Hydrogenated Bisphenol A | 5.7 |
| Poly[(2-oxiranyl)-1,2-cyclohexanediol] 2-ethyl-2 (hydroxymethyl)-1,3-propanediol ether | 2.9 |
| Epoxy-amine adduct (B) | 37.1 |
| Curing agent/Catalysts (C) | |
| Dicyandiamide (DICY) | 2.3 |
| Accelerators | |
| Aliphatic Bisurea (for DICY) | 2 |
| Isophthalic dihydrazide (IDH)) | 5.7 |
| Ceramic microspheres (D) | 12.9 |
| Flow control agent (E) | |
| Fumed silica | 5.7 |
| Additional Toughening Agent | |
| Polyvinyl acetal polymers | 4.3 |
| Pigments | |
| TiO$_2$ | 17.1 |
| UV stabilizers/additives | |
| Pentaerythritol Tetrakis(3-(3,5-di-tert-butyl-4-hydroxyphenyl)propionate | 1.4 |
| 2-[4-[(2-Hydroxy-3-dodecyloxypropyl)oxy]-2-hydroxyphenyl]-4,6-bis(2,4-dimethylphenyl)-1,3,5-triazine | 1.4 |
| Decanedioic acid, bis(2,2,6,6-tetramethyl-1-(octyloxy)-4-piperidinyl ester | 1.4 |
| Conductive Additives | |
| Carbon black particles | 0.6 |
| TOTAL (wt %) | 100 |

A curable surfacing film having a carrier embedded therein and areal weight of about 150 gsm was formed from the resin composition of Table 4 as described in Example 1. The carrier used was a 10 gsm glass scrim.

Example 4

A curable resin composition for forming a surfacing layer was prepared according to Table 5. The epoxy-amine adduct (B) was prepared by reacting 8.8 g epoxidized hydrogenated Bisphenol A with 20.5 g of poly[(2-oxiranyl)-1,2-cyclohexanediol] 2-ethyl-2 (hydroxymethyl)-1,3-propanediol ether and 8.8 g of polytetrahydrofuranamine (elastomer) at 135° C. for 1.5 hour. The procedure for forming the epoxy-amine adduct was the same as described in Example 1.

TABLE 5

| Components | wt % |
|---|---|
| Cycloaliphatic Epoxy (A) | |
| Epoxidized Hydrogenated Bisphenol A | 4.4 |
| Poly[(2-oxiranyl)-1,2-cyclohexanediol] 2-ethyl-2 (hydroxymethyl)-1,3-propanediol ether | 4.4 |
| Epoxy-amine adduct (B) | 38.1 |
| Curing agent/Catalysts (C) | |
| Dicyandiamide (DICY) | 1.5 |
| Accelerators | |
| Aliphatic polyamines (Ancamine 2014FG) | 4.4 |
| 2-Methylimidazoleazine | 1.8 |
| Ceramic microspheres (D) | 13.2 |
| Flow control agent (E) | |
| Fumed silica | 5.9 |
| Additional Toughening Agent | |
| Polyvinyl formal resin | 5.9 |
| Pigments | |
| TiO₂ | 17.6 |
| UV stabilizers/additives | |
| Light stabilizer: (3,5-di-tert-butyl-4-hydroxybenzoic acid, n-hexadecyl ester | 1.46 |
| Triazine UV absorber: 2,4-bis(2,4-dimethylphenyl)-6-(2-hydroxy-4-octyloxyphenyl)-1,3,5-triazine | 1.46 |
| TOTAL (wt %) | 100 |

A curable surfacing film having a carrier embedded therein and an areal weight of about 150 gsm was formed from the resin composition of Table 5 using the method as described in Example 1. The carrier used was a 10 gsm glass scrim.

Example 5

A curable resin composition for forming a surfacing layer was prepared according to Table 6. The epoxy-amine adduct (B) was prepared by reacting 8.8 g of 3',4'-Epoxycyclohexyl)-3,4-epoxycyclohexane) with 20.6 g of Poly[(2-oxiranyl)-1,2-cyclohexanediol] 2-ethyl-2 (hydroxymethyl)-1,3-propanediol ether and 8.8 g of polytetrahydrofuranamine (amine-terminated Elastomer) at 150° C. for 1 hour.

TABLE 6

| Components | wt % |
|---|---|
| Cycloaliphatic Epoxy (A) | |
| (3',4'-Epoxycyclohexyl)-3,4-epoxycyclohexane | 4.4 |
| Poly[(2-oxiranyl)-1,2-cyclohexanediol] 2-ethyl-2 (hydroxymethyl)-1,3-propanediol ether | 2.2 |
| Epoxy-amine adduct (B) | 28.5 |
| Curing agent/Catalyst (C) | |
| Methyl nadic anhydride mixture with carbic anhydride | 29.6 |
| Accelerators | |
| Accelerator for acid anhydride 1,8-diazabicyclo[5.4.0] undecene-7 (DBU) | 0.5 |
| Ceramic microspheres (D) | 12.1 |
| Flow control agent (E) | |
| Fumed silica | 4.4 |

TABLE 6-continued

| Components | wt % |
|---|---|
| Pigments | |
| TiO₂ | 16.4 |
| UV stabilizers/additives | |
| (3,5-di-tert-butyl-4-hydroxybenzoic acid, n-hexadecyl ester | 1 |
| 2,4-bis(2,4-dimethylphenyl)-6-(2-hydroxy-4-octyloxyphenyl)-1,3,5-triazine | 1 |
| TOTAL (wt %) | 100 |

A curable surfacing film having a carrier embedded therein and areal weight of about 150 gsm was formed from the resin composition of Table 6 using the method as described in Example 1. The carrier used was a 10 gsm glass scrim.

Example 6

A curable resin composition for forming a surfacing layer was prepared according to Table 7. The epoxy-amine adduct (B) was prepared by reacting 5.0 g of (3',4'-epoxycyclohexane)methyl 3,4-epoxycyclohexylcarboxylate with 4.9 g of (3',4'-epoxycyclohexyl)-3,4-epoxycyclohexane 23.2 g of Poly[(2-oxiranyl)-1,2-cyclohexanediol] 2-ethyl-2 (hydroxymethyl)-1,3-propanediol ether and 9.9 g of polytetrahydrofuranamine (elastomer) at 150° C. for 1 hour.

TABLE 7

| Components | wt % |
|---|---|
| Cycloaliphatic Epoxy (A) | |
| (3',4'-Epoxycyclohexyl)-3,4-epoxy cyclohexane | 4.9 |
| Poly[(2-oxiranyl)-1,2-cyclohexanediol] 2-ethyl-2 (hydroxymethyl)-1,3-propanediol ether | 5.0 |
| Epoxy-amine adduct (B) | 43 |
| Curing agent/Catalyst (C) | |
| Cationic catalyst Benzyl(4-hydroxyphenyl)methylsulfonium, hexafluoroantimonate | 1 |
| (4-Hydroxyphenyl)methyl(1-naphthylmethyl)sulfonium, hexafluoroantimonate | 1 |
| Ceramic microspheres (D) | 18.2 |
| Flow control agent (E) | |
| Fumed silica | 6.6 |
| Pigments | |
| TiO₂ | 24.8 |
| UV stabilizers/additives | |
| (3,5-di-tert-butyl-4-hydroxybenzoic acid, n-hexadecyl ester | 1.7 |
| 2,4-bis(2,4-dimethylphenyl)-6-(2-hydroxy-4-octyloxyphenyl)-1,3,5-triazine | 1.7 |
| TOTAL (wt %) | 100 |

A curable surfacing film having a carrier embedded therein and areal weight of about 150 gsm was formed from the resin composition of Table 7 using the method as described in Example 1. The carrier used was a 10 gsm glass scrim.

Example 7

A curable resin composition for forming a surfacing layer was prepared according to Table 8. The epoxy-amine adduct (B) was prepared by reacting 8.8 g (3',4'-Epoxycyclohexane) methyl 3,4-epoxycyclohexylcarboxylate) with 20.6 g of poly[(2-oxiranyl)-1,2-cyclohexanediol] 2-ethyl-2 (hydroxymethyl)-1,3-propanediol ether and 8.8 g of polytetrahydrofuranamine (amine-terminated elastomer) at 150° C. for 1 hour.

TABLE 8

| Components | wt % |
|---|---|
| Cycloaliphatic Epoxy (A) | |
| (3',4'-Epoxycyclohexyl)-3,4-epoxycyclohexane | 4.4 |
| Poly[(2-oxiranyl)-1,2-cyclohexanediol] 2-ethyl-2 (hydroxymethyl)-1,3-propanediol ether | 4.4 |
| Epoxy-amine adduct (B) | 38.2 |
| Curing agent/Catalyst (C) | |
| Boron (2-propanamine) trifluoro-, adduct with butyl glycidyl ether | 4.4 |
| Ceramic microspheres (D) | 13.2 |
| Flow control agent (E) | |
| Fumed silica | 5.8 |
| Additional Toughening Agent | |
| Polyvinyl acetal polymers | 7.3 |
| Pigments | |
| TiO$_2$ | 17.6 |
| UV stabilizers/additives | |
| Pentaerythritol Tetrakis(3-(3,5-di-tert-butyl-4-hydroxyphenyl)propionate | 1.4 |
| 2-[4-[(2-Hydroxy-3-dodecyloxypropyl)oxy]-2-hydroxyphenyl]-4,6-bis(2,4-dimethylphenyl)-1,3,5-triazine | 1.4 |
| Decanedioic acid, bis(2,2,6,6-tetramethyl-1-(octyloxy)-4-piperidinyl ester | 1.4 |
| Conductive Additives | |
| Carbon black particles | 0.5 |
| TOTAL (Wt, %) | 100 |

A curable surfacing film having a carrier embedded therein and areal weight of about 150 gsm was formed from the resin composition of Table 8 using the method as described in Example 1. The carrier used was a 10 gsm glass scrim.

Example 8

A curable resin composition for forming a surfacing layer was prepared according to Table 9. The epoxy-amine adduct (B) was prepared by reacting 9.7 g of Epoxidized Hydrogenated Bisphenol A with 22.6 g of poly[(2-oxiranyl)-1,2-cyclohexanediol] 2-ethyl-2 (hydroxymethyl)-1,3-propanediol ether and 9.7 g of polytetrahydrofuranamine (elastomer) at 135° C. for 1.5 hour.

TABLE 9

| Components | wt % |
|---|---|
| Cycloaliphatic Epoxy (A) | |
| Epoxidized Hydrogenated Bisphenol A | 4.85 |
| Poly[(2-oxiranyl)-1,2-cyclohexanediol] 2-ethyl-2 (hydroxymethyl)-1,3-propanediol ether | 4.85 |
| Epoxy-amine adduct (B) | 42 |
| Curing agent/Catalyst (C) | |
| Dicyandiamide (DICY) | 2.6 |
| Accelerator | |
| Aliphatic Bisurea (for DICY) | 4.8 |
| Ceramic microspheres (D) | 14.5 |
| Flow control agent (E) | |
| Fumed silica | 6.5 |
| Additional Toughening Agent | |
| PES-PEES co-polymer | 1 |
| CSR particles | 6.4 |
| Alicyclic epoxy with 25-30 wt % CSR particles (MX 553) | |
| Pigments | |
| TiO$_2$ | 12.5 |
| TOTAL (wt %) | 100 |

A curable surfacing film having a carrier embedded therein and areal weight of about 150 gsm was formed from the resin composition of Table 9 using the method as described in Example 1. The carrier used was a 10 gsm glass scrim.

Surfacing Film Evaluation

Test panels were prepared using the surfacing materials produced according to Examples 1-8. Each test panel is a composite panel fabricated by placing a surfacing material on a tool, followed by laying up of prepreg plies (CYCOM 5276-1 from Cytec Industries Inc., carbon fibers/epoxy based prepregs) to form a prepreg layup. The prepreg layup was then cured at a temperature about 177° C. for 2 hours under 80 psi in an autoclave.

After curing, the composite panels surfaced with the surfacing films were inspected for surface appearance defects (pits, pin holes). Then the composite panels were evaluated for its Tg, UV stability (color shift under UV exposure), paint stripper resistance, dry and wet paint adhesion with or without UV exposure.

Table 10 shows the surface properties and test results for the test panels. The test panel number corresponds to the Example number.

TABLE 10

| | Test Panels | | | | | | | |
|---|---|---|---|---|---|---|---|---|
| | 1 | 2 | 3 | 4 | 5 | 6 | 7 | 8 |
| $T_g$ (° C.) | 242 | 217 | 233 | 181 | 246 | 263 | 238 | 231 |
| UV Stability (Color Change ΔE* after UV irradiation) | | | | | | | | |
| Day 0 | 0 | 0 | 0 | 0 | 0 | 0 | 0 | 0 |
| Day 1 | 0.8 | 1.9 | 1.7 | 2.1 | 1.3 | 1.5 | 1.5 | 1.9 |
| Day 4 | 1.64 | 2.4 | 2.3 | 2.7 | 2 | 2.4 | 2.1 | 2.2 |
| Day 7 | 2.1 | 2.7 | 2.5 | 3.4 | 2.4 | 2.9 | 2.3 | 2.5 |

TABLE 10-continued

| | | Test Panels | | | | | | | |
|---|---|---|---|---|---|---|---|---|---|
| | | 1 | 2 | 3 | 4 | 5 | 6 | 7 | 8 |
| Paint stripper resistance | | | | | | | | | |
| | Day 0 | 0 | 0 | 0 | 0 | 0 | 0 | 0 | 0 |
| | Day 1 | 0.61 | 0.68 | 0.75 | 0.88 | 0.78 | 0.85 | 0.64 | 1.25 |
| | Day 2 | 0.95 | 1.03 | 1.08 | 1.15 | 0.95 | 1.10 | 0.90 | 1.45 |
| | Day 4 | 1.33 | 1.38 | 1.50 | 1.55 | 1.30 | 1.45 | 1.38 | 1.60 |
| | Day 7 | 1.49 | 1.70 | 1.75 | 1.88 | 1.78 | 1.88 | 1.78 | 1.78 |
| Surface pencil hardness | | | | | | | | | |
| | Day 0 | 9H | 9H | 9H | 9H | 9H | 9H | 9H | 9H |
| | Day 1 | 9H | 9H | 9H | 9H | 9H | 9H | 9H | 9H |
| | Day 2 | 9H | 9H | 9H | 9H | 9H | 9H | 9H | 9H |
| | Day 4 | 9H | 9H | 9H | 8H | 9H | 8H | 9H | 9H |
| | Day 7 | 9H | 8H | 8H | 7H | 7H | 7H | 9H | 8H |
| Paint adhesion | | | | | | | | | |
| Dry scribe w/UV | 7 days | 10 | 10 | 10 | 10 | 10 | 10 | 10 | 10 |
| Dry scribe w/o UV | | 10 | 10 | 10 | 10 | 10 | 10 | 10 | 10 |

All the surfacing film examples, when tested alone, have shown excellent UV stability with minimal noticeable color change ($\Delta E^* < 1$) after UV irradiation for extended time period (>7+ days). Most of the test panels surfaced with the curable UV stable surfacing films also showed good paint stripper resistance with $T_g$ greater than 200° C.

The glass transition temperature (Tg) of the cured surfacing films was determined by using either a modulated DSC (TA 2910) or a thermal mechanical analyzer (TMA 2940, TA Instruments) under nitrogen at ramp of 10° C./min within 30° C.-300° C. temperature range.

UV Stability Testing

The UV resistance or UV stability of composite panels (in the form of 3"×6" specimen size, with 0.15 mm thickness) surfaced with the surfacing film, was measured according to ASTM G154. ASTM G154 refers to a Standard Test Method for accelerated weather testing of UV stability of coating films by exposing the surface under fluorescent UV light sources. The cured test panels were irradiated by UVA lamp (340 nm wavelength) at 1.55 W/m2 for various time periods. Instrument used for UV testing is a QUV accelerated weathering tester Each test panel surfaces with curable composition film was prepared and exposed to QUV test conditions specified. The test panels were taken out periodically to test its color change. The color change (CIELAB $\Delta E^*$) of the test panels was measure by X-Rite SP 62 Spectrophotometer. The Color difference ($\Delta E^*$) before and after UV exposure was measured and reported. The smaller of color difference, the more UV stable of the test panel. The Color difference ($\Delta E^*$) less than 2.5 is considered barely noticeable color change with good UV stability.

Paint Stripper Resistance Testing

Paint stripper resistance of unpainted, surfaced composite panels (2"×2" specimen size, with 0.15 mm thickness) were measured by measuring the paint stripper fluid uptake and surface pencil hardness change over the immersion period (up to 168 hours at ambient room temperature) of benzyl alcohol-based paint stripper solution (Cee Bee 2012A available from McGean or Turco 1270-6 available from Henkel) used for aerospace composite structure paint-stripping process. The weight of each test panel was measured before and after paint stripper soak at interval of 24 hours, 48 hours and up to 168 hours (7 days). The paint stripper fluid uptake (weight change over immersion time, expressed in wt. %) of the tested panel was measured at same test intervals up to 168 hours (7 days) immersion.

The surface of each unpainted test panel was immersed the benzyl alcohol-based paint stripper solution for up to 168 hours at ambient room temperature, and then tested for pencil hardness change during the immersion period according to ASTM D3363. ASTM D3363 refers to a Standard Test Method for determining the surface hardness of clear and pigmented organic coating film on a substrate. The pencil hardness scale is as follows: 6B (softest), 5B, 4B, 3B, 2B, B, HB, F, H, 2H, 3H, 4H, 5H, 6H, 7H, 8H, 9H (hardest). The pencil hardness of the test panel was measured before and after soaking in the paint stripper at interval of 24 hours, 48 hours and up to 168 hours (7 days). Pencil hardness that changes more than 2H level upon 24 hour immersion is not considered as having good paint stripper resistance.

Dry and Wet Paint Adhesion With or Without UV Exposure

Dry and wet scribe paint adhesion of painted composite panels (in the form of 3"×6" specimen size, with 0.15 mm thickness) surfaced with the surfacing film, with or without UV exposure prior to painting, were measured according to ASTM D3359. ASTM D3359 refers to a Standard Test Method for assessing the surface adhesion of coating films to substrates by applying and removing pressure-sensitive tape over cuts made in the film (cross-hatch scribe tape test). The cured test panels were exposed to zero (without UV), 200 kJ/m² or 1000 kJ/m² ultraviolet (UV-A) radiation in accordance with AATCC Test Method 16, Option 3. Instrument used for UV testing is a Xeno Weather-o-meter, such as Atlas CI3000 FadeoMeter. Each test panel surface was prepared (cleaned, with and without sanding) and applied with an exterior decorative paint coating used in aerospace painting (epoxy paint primer followed by a polyurethane based top-coat). Subsequently, dry paint adhesion test was conducted in accordance with ASTM D3359. For conducting wet paint adhesion, the UV exposed test panels were painted and then immersed in de-ionized water at 75° F. for 7 days. Wet paint adhesion test was then conducted in accordance with ASTM D3359.

Example 9 (Comparison)

For comparison, a surfacing film was prepared based on the formulation shown in Table 11. Amounts are in weight percentage (wt %).

TABLE 11

| Components | wt % |
|---|---|
| Tetraglycidyl 4,4'-diaminodiphenylmethane | 10 |
| Triglycidyl ether of aminophenol | 12 |
| Pre-react adduct of Bisphenol A, Bis-A epoxy, and Hycar elastomer | 30 |
| Bisphenol A diglycidyl ether with CSR particles (25 wt %) | 12 |
| Dicyandiamide | 2.3 |
| 4,4'-Methylene bis(phenyldimethylurea) | 2.3 |
| Ceramic microspheres | 23 |
| Fumed silica | 2.5 |
| TiO$_2$ pigment | 5.9 |
| Total | 100 |

The surfacing film based on the Table 11 composition was prepared in a similar procedure as described in Example 1. A composite test panel was prepared using the comparative surfacing film of Table 11. The cured test panel was tested to determine its Tg, UV stability, paint stripper resistance, and paint adhesion, using the test procedures described previously. The comparative test results are shown in Table 12.

TABLE 12

| | | Comparative Example |
|---|---|---|
| T$_g$ (° C.) | | 175 |
| UV Stability (Color Change ΔE* after UV irradiation) | | |
| | Day 0 | 0 |
| | Day 1 | 13 |
| | Day 4 | 17 |
| | Day 7 | 19.5 |
| Paint stripper resistance | | |
| | Day 0 | 0 |
| | Day 1 | 0.48 |
| | Day 2 | 0.95 |
| | Day 4 | 1.41 |
| | Day 7 | 1.70 |
| Surface pencil hardness | | |
| | Day 0 | 9H |
| | Day 1 | 9H |
| | Day 2 | 8H |
| | Day 4 | 7H |
| | Day 7 | 6H |
| Paint adhesion | | |
| Dry scribe w/UV | 7 days | 10 |
| Dry scribe w/o UV | | 10 |

As can be seen from Table 12, the aromatic epoxy based surfacing film showed significant color change under UV exposure, indicating its high UV sensitivity and is not UV resistant.

What is claimed is:

1. A surfacing material comprising at least one curable resin layer, said curable resin layer comprising:
   (A) one or more cycloaliphatic epoxy resin(s), each having two or more epoxy groups per molecule;
   (B) an epoxy-amine adduct having two or more epoxy groups per molecule and obtained by a reaction of (i) an epoxy compound having two or more alicyclic epoxy groups per molecule with (ii) an amine compound having two or more amino groups per molecule;
   (C) a curing agent and/or a catalyst;
   (D) ceramic microspheres; and
   (E) a flow control agent in the form of inorganic particles, which are not ceramic microspheres.

2. The surfacing material of claim 1, wherein the at least one curable resin layer further comprises:
   (F) an inorganic pigment selected from metal oxides and carbon black.

3. The surfacing material of claim 1, wherein the at least one curable resin layer further comprises:
   (G) a toughening agent that is not an epoxy-amine adduct and is selected from: thermoplastic polymers, elastic polymers, and core-shell rubber (CSR) particles.

4. The surfacing material according to claim 3, wherein the toughening agent (G) is selected from: (i) polyvinyl acetal resins (PVB); (ii) polyvinyl formal resins; (iii) a thermoplastic copolymer of polyethersulfone (PES) and polyetherethersulfone (PEES); and (iv) core-shell rubber (CSR) particles.

5. The surfacing material according to claim 1, wherein the one or more cycloaliphatic epoxy resin(s) is/are represented by the following general Formula I:

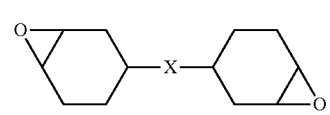

(I)

where X represents a single bond or a linkage group; the linkage group is selected from: divalent hydrocarbon groups, carbonyl group (—CO—), ether bond (—O—), ester bond (—COO—), amide bond (—CONH—), carbonate bond (—OCOO—), and groups containing two or more of said groups linked to each other.

6. The surfacing material according to claim 5, wherein the divalent hydrocarbon groups are selected from: straight or branched chain alkylene groups having 1 to 18 carbon atoms, including methylene, methylmethylene, dimethylmethylene, ethylene, propylene, and trimethylene groups; and divalent alicyclic hydrocarbon groups, including 1,2-cyclopentylene, 1,3-cyclopentylene, cyclopentylidene, 1,2-cyclohexylene, 1,3-cyclohexylene, 1,4-cyclo-hexylene, and cyclohexylidene groups.

7. The surfacing material according to claim 1, wherein the one or more cycloaliphatic epoxy resin(s) is/are selected from polyepoxides having the following chemical structures:

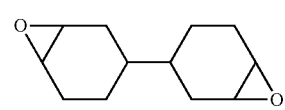

(1)

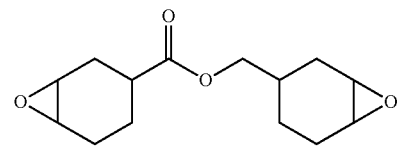

(2)

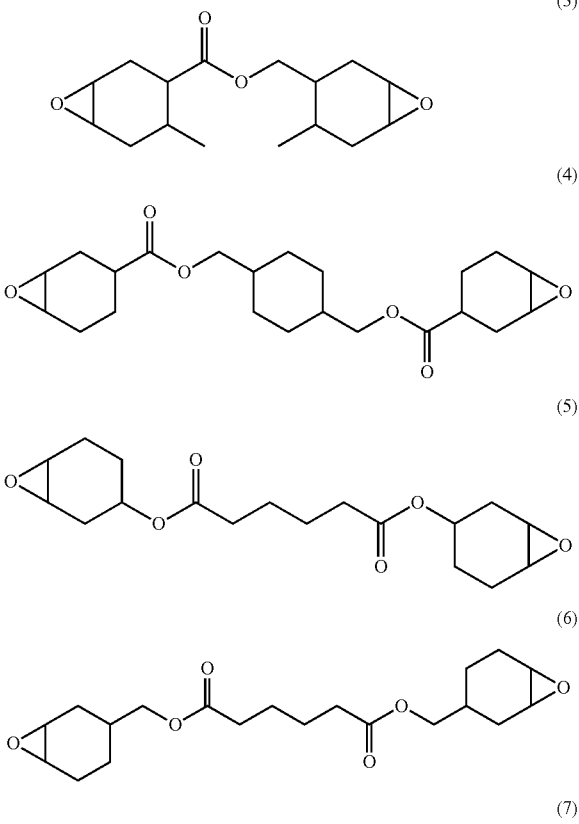

where n is an integer from 1 to 30;

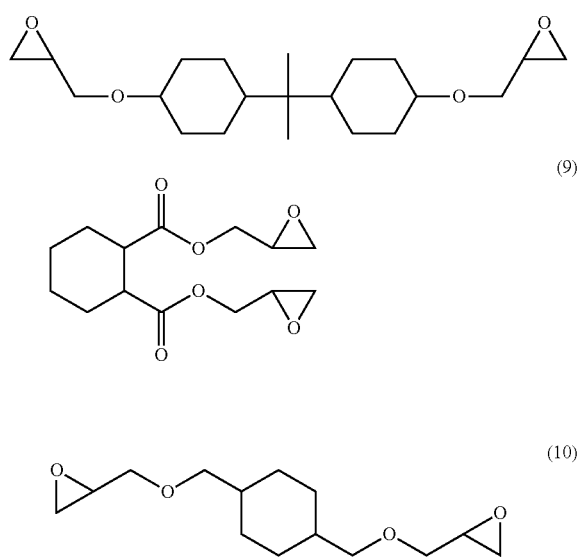

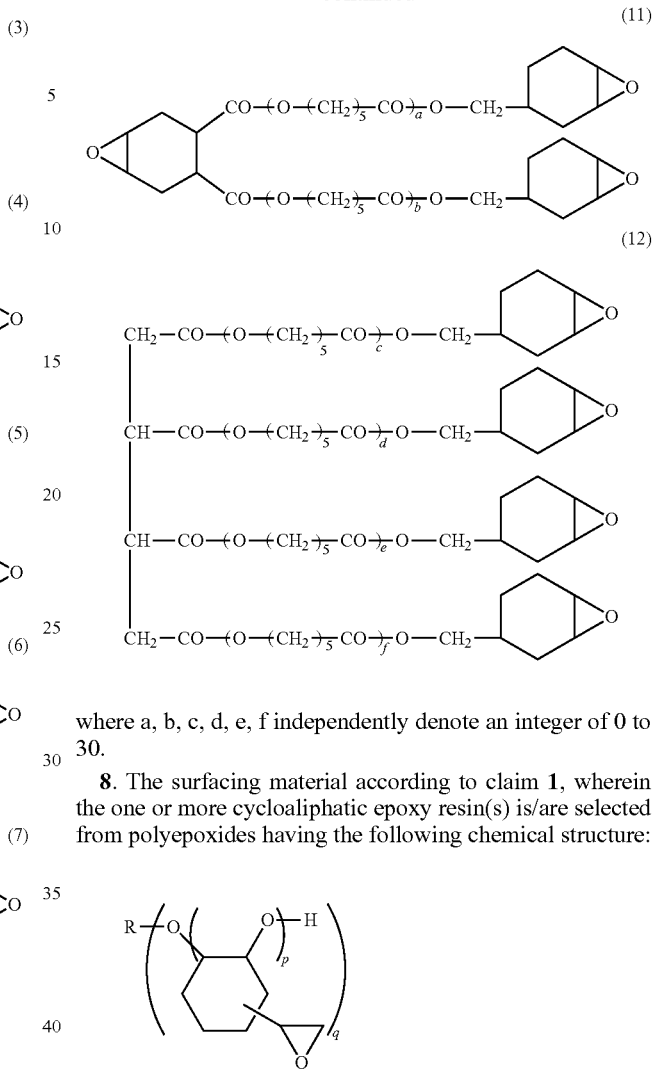

where a, b, c, d, e, f independently denote an integer of 0 to 30.

8. The surfacing material according to claim 1, wherein the one or more cycloaliphatic epoxy resin(s) is/are selected from polyepoxides having the following chemical structure:

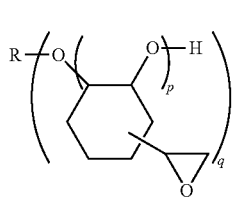

where R represents a group corresponding to a q-valent (q-hydric) alcohol R—(OH)q, except for removing —OH(s) in a number of q there from; p is an integer from 1 to 50; and q is an integer from 1 to 10.

9. The surfacing material according to claim 1, wherein the one or more cycloaliphatic epoxy resin(s) has/have a viscosity of 2500 mPa·s or less at 25° C., as determined by Brookfield Viscometer.

10. The surfacing material according to claim 1, wherein the one or more cycloaliphatic epoxy resin(s) is/are selected from: cyclohexanedimethanol diglycidyl ether; cyclohexanediol diglycidyl ether; poly[(2-oxiranyl)-1,2-cyclohexanediol] 2-ethyl-2 (hydroxymethyl)-1,3-propanediol ether; 3',4'-epoxycyclohexane)methyl 3,4-epoxycyclohexylcarboxylate; 3,4-epoxycyclohexylmethyl-3',4'-epoxycyclohexanecarboxylate; 3',4'-epoxycyclohexyl)-3,4-epoxycyclohexane; and hexahydrophthalic acid diglycidylester.

11. The surfacing material according to claim 1, wherein the epoxy-amine adduct has from 2 to 10 epoxy groups per molecule, and the epoxy groups are positioned at the molecular chain ends of the epoxy-amine adduct.

12. The surfacing material according to claim 1, wherein the epoxy-amine adduct is represented by Formula II:

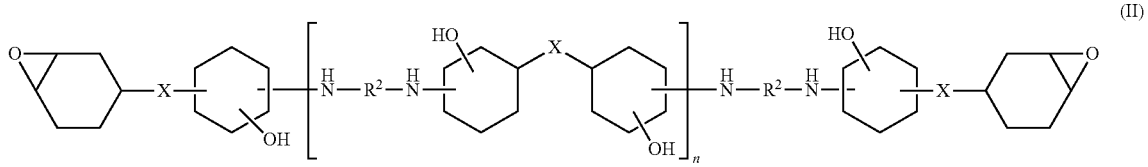

(II)

where X is, in each occurrence, independently selected from a single bond and a divalent group having at least one atom; $R^2$ is a divalent organic group having a carbon atom at each bonding site; and n is an integer of 1 or higher.

13. The surfacing material according to claim 1, wherein the amine compound in the reaction to obtain the epoxy-amine adduct is selected from: polypropylene glycol 130 bis(2-aminopropyl ether; triethyleneglycol diamine; trimethylolpropane polyoxypropylene triamine, and poly(oxy-1,4-butanediyl), alpha-(4-amino-butyl)-omega-(4-aminobutoxy).

14. The surfacing material according to claim 1, wherein the curing agent and/or catalyst (C) is/are selected from:
  (i) amine-containing compound;
  (ii) Lewis acid-amine complex;
  (iii) acid anhydride; and
  (iv) cationic catalyst.

15. The surfacing material according to claim 14, wherein the curing agent and/or catalyst is a Lewis acid-amine complex selected from: $BF_3$·n-hexylamine, $BF_3$·monoethylamine, $BF_3$·benzylamine, $BF_3$·diethylamine, $BF_3$·piperidine, $BF_3$·triethylamine, $BF_3$·aniline, $BF_4$·n-hexylamine, $BF_4$·monoethylamine, $BF_4$·benzylamine, $BF_4$·diethylamine, $BF_4$·piperidine, $BF_4$·triethylamine, $BF_4$·aniline, $PF_5$·ethylamine, $PF_5$·isopropylamine, $PF_5$·butylamine, $PF_5$·laurylamine, $PF_5$·benzylamine, and $AsPF_5$·laurylamine.

16. The surfacing material according to claim 14, wherein the curing agent and/or catalyst is an acid anhydride selected from: methyltetrahydrophthalic anhydride, methylhexahydrophthalic anhydride, dodecenylsuccinic anhydride, methyl-endomethylene-tetrahydrophthalic anhydride, phthalic anhydride, tetrahydrophthalic anhydride, hexahydrophthalic anhydride, methyl nadic anhydride, carbic anhydride, methylcyclohexenedicarboxylic anhydride, and mixtures thereof.

17. The surfacing material according to claim 16, wherein the acid anhydride is used in combination with a curing accelerator selected from diazabicycloun-decene, phosphorous compounds, tertiary and quaternary amines.

18. The surfacing material according to claim 14, wherein the curing agent and/or catalyst is a cationic catalyst selected from: aryldiazonium salts, aryliodonium salts, arylsulfonium salts, and blocked acids.

19. The surfacing material according to claim 1, wherein the curable resin composition further comprises a curing accelerator selected from: imidazole, dihydrazide, aliphatic polyamine, alkyl and aryl substituted ureas, and bisureas.

20. The surfacing material according to claim 1, wherein the curable resin composition does not contain any aromatic epoxy resins.

21. The surfacing material according to claim 1, wherein the flow control agent (E) is selected from: talc, mica, calcium carbonate, alumina, and silica.

* * * * *